(12) United States Patent
Frederick et al.

(10) Patent No.: US 9,763,090 B2
(45) Date of Patent: Sep. 12, 2017

(54) TECHNIQUES FOR DETERMINING AND COMMUNICATING PRESENCE

(71) Applicant: Facebook, Inc., Menlo Park, CA (US)

(72) Inventors: Adriel Frederick, San Francisco, CA (US); Antony Fu, Cupertino, CA (US); Martin Rehwald, Mountain View, CA (US); Denise Moreno, San Jose, CA (US); Surendra Gadodia, Arcadia, CA (US)

(73) Assignee: FACEBOOK, INC., Menlo Park, CA (US)

( * ) Notice: Subject to any disclaimer, the term of this patent is extended or adjusted under 35 U.S.C. 154(b) by 48 days.

(21) Appl. No.: 13/799,621

(22) Filed: Mar. 13, 2013

(65) Prior Publication Data

US 2014/0171035 A1    Jun. 19, 2014

Related U.S. Application Data

(62) Division of application No. 13/715,714, filed on Dec. 14, 2012.

(51) Int. Cl.

| G06F 15/16 | (2006.01) |
|---|---|
| H04W 12/06 | (2009.01) |
| H04L 12/58 | (2006.01) |
| G06Q 10/10 | (2012.01) |
| G06Q 50/00 | (2012.01) |
| H04M 3/42 | (2006.01) |
| H04W 4/14 | (2009.01) |
| H04L 29/08 | (2006.01) |

(52) U.S. Cl.
CPC ............ *H04W 12/06* (2013.01); *G06Q 10/10* (2013.01); *G06Q 50/01* (2013.01); *H04L 51/04* (2013.01); *H04L 51/32* (2013.01); *H04L 67/22* (2013.01); *H04M 3/42365* (2013.01); *H04W 4/14* (2013.01); *H04L 51/24* (2013.01)

(58) Field of Classification Search
CPC ........................... H04M 3/42365; H04W 4/14
USPC .............................. 709/204, 206, 217, 218
See application file for complete search history.

(56) References Cited

U.S. PATENT DOCUMENTS 6,469,997 B1 * 10/2002 Dorenbosch et al. ........ 370/337
6,643,355 B1    11/2003 Tsumpes
(Continued)

FOREIGN PATENT DOCUMENTS

| GB | 2439463 | 12/2007 |
|---|---|---|
| GB | 1998500 | 12/2008 |

OTHER PUBLICATIONS

"What Does the "Last Active" Time Stand for on Facebook Messenger Mobile App?" GotKnowHow.com. N.p., Oct. 3, 2012. Web. Dec. 10, 2014.*

(Continued)

*Primary Examiner* — Liangche A Wang
*Assistant Examiner* — Kaylee Huang

(57) ABSTRACT

Techniques for determining and communicating presence are described. An apparatus may comprise a presence component and a display component. The presence component may be operative to determine whether a first user is present to receive short message service (SMS) messages on a mobile device. The display component may be operative to indicate to a second user whether the first user is present to receive SMS messages on the mobile device. Other embodiments are described and claimed.

14 Claims, 22 Drawing Sheets

(56) References Cited

U.S. PATENT DOCUMENTS

| | | | |
|---|---|---|---|
| 7,363,345 B2 | 4/2008 | Austin-Lane et al. | |
| 7,483,525 B2 | 1/2009 | Chaddha et al. | |
| 8,194,640 B2 | 6/2012 | Ramachandran et al. | |
| 2002/0165000 A1* | 11/2002 | Fok | H04L 12/581 |
| | | | 455/466 |
| 2003/0018704 A1 | 1/2003 | Polychronidis et al. | |
| 2003/0046421 A1 | 3/2003 | Horvitz et al. | |
| 2004/0223485 A1 | 11/2004 | Arellano et al. | |
| 2004/0225637 A1 | 11/2004 | Heinzel et al. | |
| 2004/0233485 A1 | 11/2004 | Moon et al. | |
| 2005/0068159 A1 | 3/2005 | Hung | |
| 2006/0059243 A1 | 3/2006 | Haggard | |
| 2008/0063154 A1 | 3/2008 | Tamari et al. | |
| 2008/0082613 A1* | 4/2008 | Szeto et al. | 709/206 |
| 2008/0140794 A1* | 6/2008 | Rybak | G06Q 10/10 |
| | | | 709/207 |
| 2008/0243853 A1 | 10/2008 | Reding et al. | |
| 2009/0274286 A1 | 11/2009 | O'Shaughnessy et al. | |
| 2009/0319577 A1 | 12/2009 | Obasanjo et al. | |
| 2010/0016002 A1* | 1/2010 | Konicek et al. | 455/466 |
| 2010/0049697 A1 | 2/2010 | Hsiao et al. | |
| 2010/0082667 A1 | 4/2010 | Callanan et al. | |
| 2010/0142700 A1 | 6/2010 | Lee et al. | |
| 2010/0167766 A1* | 7/2010 | Duarte et al. | 455/466 |
| 2010/0291899 A1* | 11/2010 | Machani | H04W 12/12 |
| | | | 455/411 |
| 2010/0312831 A1 | 12/2010 | Xie et al. | |
| 2011/0029606 A1 | 2/2011 | Ozawa | |
| 2011/0029616 A1 | 2/2011 | Wang et al. | |
| 2011/0038287 A1 | 2/2011 | Agarwal et al. | |
| 2011/0040895 A1 | 2/2011 | Griffin et al. | |
| 2011/0041076 A1 | 2/2011 | Sinn et al. | |
| 2011/0072099 A1* | 3/2011 | Harju et al. | 709/206 |
| 2011/0092189 A1* | 4/2011 | Helferich | H04L 12/6418 |
| | | | 455/412.2 |
| 2011/0125846 A1 | 5/2011 | Ham et al. | |
| 2011/0273378 A1 | 11/2011 | Alameh et al. | |
| 2011/0276372 A1 | 11/2011 | Spivack et al. | |
| 2011/0312350 A1* | 12/2011 | Agerholm | G08B 13/196 |
| | | | 455/466 |
| 2012/0003957 A1 | 1/2012 | Agevik et al. | |
| 2012/0036147 A1 | 2/2012 | Borst et al. | |
| 2012/0089698 A1 | 4/2012 | Tseng | |
| 2012/0099524 A1 | 4/2012 | Cai et al. | |
| 2012/0117178 A1 | 5/2012 | Price et al. | |
| 2012/0124146 A1 | 5/2012 | Hsiao et al. | |
| 2012/0311045 A1 | 12/2012 | Sylvain | |

OTHER PUBLICATIONS

Extended European Search Report received for European Patent Application No. 13197221.8-1958, mailed Mar. 11, 2014, 6 pages.
Bachir, Chihani et al., "Enhancing Existing Communication Services with Context Awareness", J. of Computer Networks and Communications, vol. 3, No. 2, May 30, 2012, 11 pages.
Office Action received for U.S. Appl. No. 13/715,714, mailed Sep. 10, 2014, 27 pages.
International Search Report and Written Opinion received for PCT Patent Application No. PCT/US2014/012092, mailed May 20, 2014, 18 pages.
International Search Report and Written Opinion received for PCT Patent Application No. PCT/IB2014/058982, mailed Jun. 2, 2014, 10 pages.
International Search Report and Written Opinion received for PCT Patent Application No. PCT/US2014/012207, mailed May 27, 2014, 17 pages.
Office Action received for U.S. Appl. No. 13/799,557, mailed Nov. 21, 2014, 37 pages.
Office Action received for U.S. Appl. No. 13/799,679, mailed Nov. 20, 2014, 28 pages.
Office Action received for U.S. Appl. No. 13/799,679, mailed Jul. 19, 2016, 20 pages.
Office Action received for U.S. Appl. No. 13/715,714, mailed Jan. 3, 2017, 34 pages.

* cited by examiner

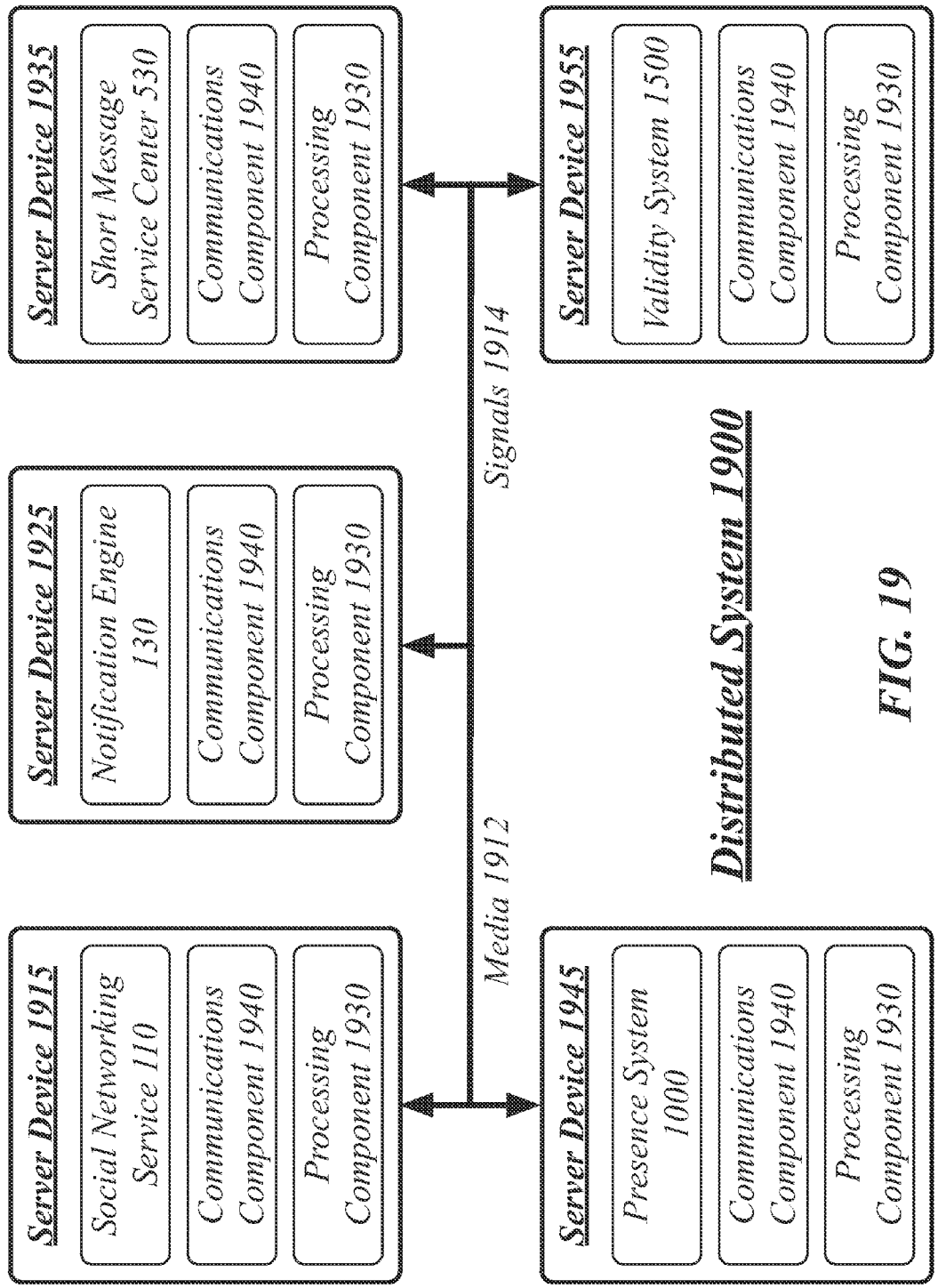

2000

Receive from a social networking service an event associated with a subscriber of the social networking service.
2002

Determine to communicate the event to the subscriber.
2004

Determine one or more channels of a plurality of channels to use to communicate the event to the subscriber according to rankings associated with each channel, the rankings specific to the subscriber and determined according to subscriber information.
2006

Construct a notification based on the event.
2008

Transmit the notification to the subscriber using the determined one or more channels.
2010

*FIG. 20*

TECHNIQUES FOR DETERMINING AND COMMUNICATING PRESENCE

BACKGROUND

Subscribers to Internet-based services have come to expect those services to reach out to them to communicate important information rather than merely rely on subscribers to retrieve information on their own initiative. These services, however, may possess multiple methods of contacting subscribers and may there need to select one or more of the methods when contacting a subscriber. Further, the communication of information may be aided by managing the in-progress transmission of the information to the subscriber. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later. Various embodiments are generally directed to techniques for determining and communicating presence. Some embodiments are particularly directed to techniques for determining presence based on the transmission of partial short message service messages. In one embodiment, for example, an apparatus may comprise a presence component and a display component. The presence component may be operative to determine whether a first user is present to receive short message service (SMS) messages on a mobile device. The display component may be operative to indicate to a second user whether the first user is present to receive SMS messages on the mobile device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 19 illustrates an embodiment of a distributed system for the system of FIG. 1.

FIG. 20 illustrates an embodiment of a logic flow for the system of FIG. 1.

DETAILED DESCRIPTION

Figure 1:
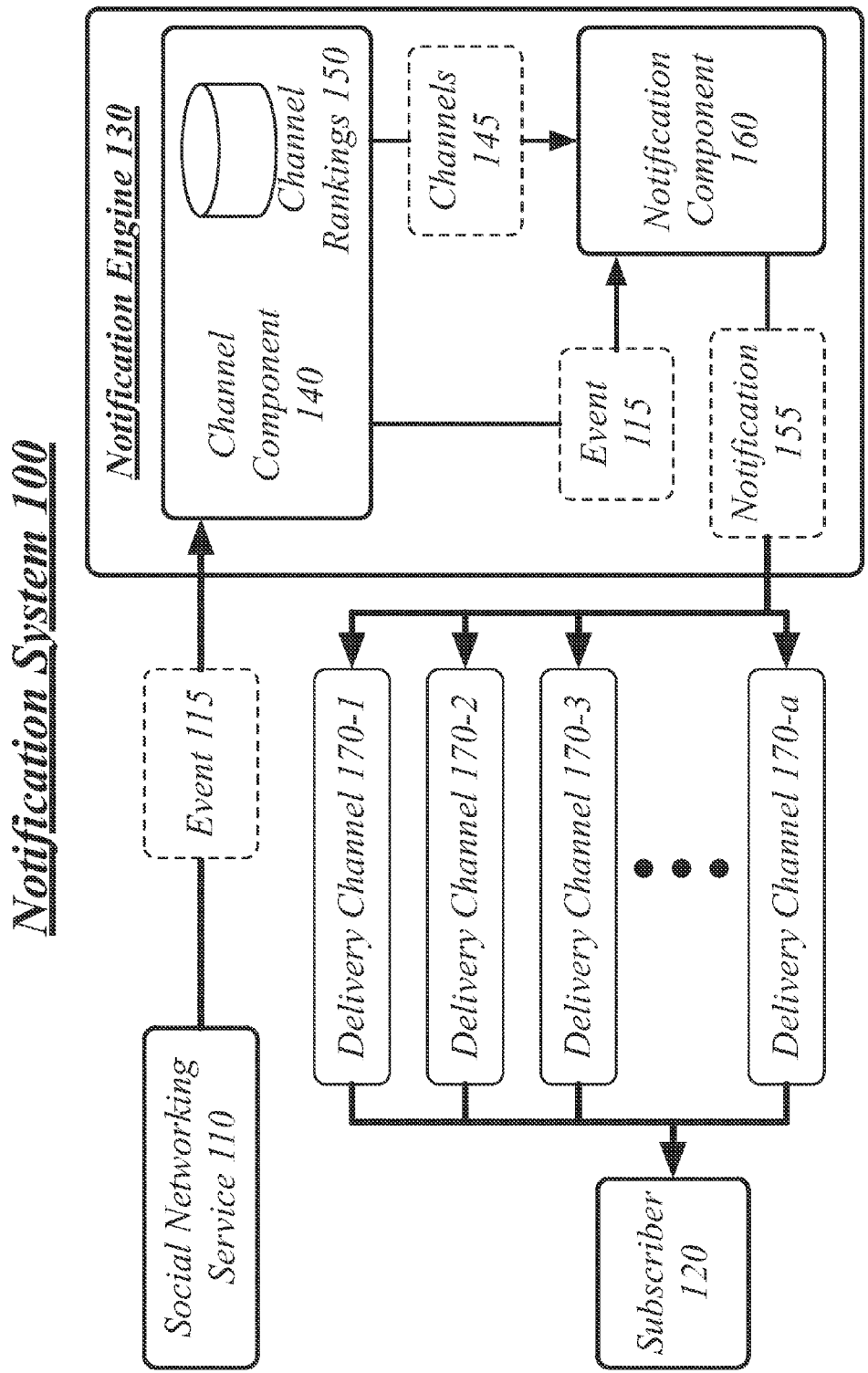
FIG. 1 illustrates an embodiment of a notification system.

Various embodiments are generally directed to an enhanced notification system for communicating notifications to subscribers. Some embodiments are particularly directed to techniques for communicating notifications to subscribers through a process of intelligently and programmatically selecting delivery channels and actively managing the delivery process on those delivery channels.

An Internet user may subscribe to an Internet-based service and therefore desire to be contacted by that service when an event of interest occurs. For example, an individual may register with a social networking service, set up a profile on the service, register defined relationships with other subscribers on the service, and perform other social networking activities. Events may then occur on the service such as another subscriber sending a message to the subscriber, posting a picture containing the subscriber, tagging a picture with the subscriber, placing a message on the subscriber's profile, or other events initiated by another subscriber, and so forth. Events may also occur that are not dependent on another subscriber, such as the service detecting a possible security issue with the subscriber's account, sending a reminder to the subscriber of an event registered with the service, and the like. A notification system may be used to inform subscribers of these and other events.

It will be appreciated that any event of which the social networking service has information may be considered to have occurred on the service. The service may gather, collect, receive, be sent, or otherwise gain knowledge of events that occur elsewhere, and consider and carry out informing the subscriber of those events which occur internally to the social networking service. In some cases, this may be accomplished through a third-party plugin from another entity being installed on or registered with the social networking service. In some cases, this may be accomplished through a plugin for the social networking service being registered with or installed on another service. For example, a blogging service may be arranged to share information with the social networking service, after which the social networking service may treat events that occur on the blogging service as having occurred on the social networking service for the purposes of communicating events to subscribers. This may be accomplished through the blogging service registering a blogging-service plugin with the social networking service, through the social networking service registering a social-networking plugin with the blogging service, or through any other mechanism which allows the social networking service to gain knowledge of events that occur on the blogging service.

It will be appreciated that the act of subscribing to a service may not explicitly include a request to be contacted in the case of interesting events, and may merely refer to the act of registering with or otherwise creating an association with a service. Similarly, an Internet-based service may merely be a service which makes use of the Internet for the provisioning of some of its services and not necessarily all of them.

Business logic may be implemented to determine whether to notify a particular subscriber of a particular event. Upon the occurrence of an event, the service may perform a determination of whether to transmit the event to the subscriber in the form of a notification. These determinations may be based on both global factors—factors which apply to all subscribers to the service—and subscriber-specific factors. Similarly, the determinations may depend on factors common to all events and may depend on factors specific to a type of event. For example, it may be determined that all subscribers will be notified in the case of a security issue with their service account. However, it may be determined that while some subscribers desire to receive notification of being, for example, tagged in a photo, that other subscribers do not, and as such the determination of whether to send a photo-tagging notification would be different for different subscribers. This determination may be based on global default assumptions about what subscribers will prefer modified by explicit subscriber preferences, implicit subscriber preferences determined through machine learning, and current information about the status of a subscriber.

The service may have multiple delivery channels for transmitting a notification of an event to the subscriber or for attempting to use to transmit the notification. For instance, the subscriber may have registered one or more phone numbers with the service which might be used for voice calls or Short Message Service (SMS) messages. A subscriber may have registered one or more electronic mail (e-mail) addresses with the service to which notifying e-mails may be sent. A subscriber currently viewing a web page for the service may receive information pushed onto the web page, such as a pop-up notification, notification indicator, or other method of modifying a web page to display a notification. A subscriber may have registered one or more instant message (IM) accounts with the service over which IM-based notification may be sent to the subscriber. The subscriber may have one or more applications installed on a computer—such as on a desktop, laptop, or mobile device—to which notifications may be pushed.

It will be appreciated that, rather than having registered one or more of the delivery channels known to the service, the subscriber may have determined a delivery channel because of information entered by other subscribers, through another third-party source, or because the delivery channel is provided by the Internet-based service, such as an e-mail address provided to the subscriber by the service.

With multiple delivery channels for contacting a subscriber, and a notification to deliver, a service may therefore have to select a subset of the delivery channels to use to send the notification. This selection may be based on both global factors—factors which apply to all subscribers to the service—and subscriber-specific factors. Similarly, the determinations may depend on factors common to all events and may depend on factors specific to a type of event. For example, it may be determined that all known delivery channels will be simultaneously used in the case of a security issue with a subscriber's account with the service. However, it may be determined that a given subscriber prefers to receive notification of being, for example, sent a message by another subscriber using e-mail or push notification, but not SMS. This selection may be based on global default assumptions about what delivery channels subscribers will prefer modified by explicit subscriber preferences, implicit subscriber preferences determined through machine learning, and current information about the status of a subscriber.

The occurrence of an event relevant to a subscriber may, therefore, initiate a multi-stage process in the service of determining how to responds to it. In a first stage, it is determined whether to transmit the event to the subscriber. In a second stage, if the event is to be communicated it is determined which delivery channel(s) of a plurality of channels to use to communicate the event. In a third stage—again, if the event is to be communicated—the event is transformed into a notification, a machine or human-readable message communicating news of the event, and transmission is attempted over the determined channels, with that transmission monitored, managed, and potentially modified by the service. As a result, the embodiments can improve a service's utility to its subscribers through the intelligent determination of when and how to contact them.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a notification system 100. In one embodiment, the notification system 100 may comprise a computer-implemented notification system 100 having a notification engine 130 comprising one or more components. Although the notification system 100 shown in FIG. 1 has a limited number of elements in a certain topology, it may be appreciated that the notification system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of delivery channels 170- a may include five delivery channels 170-1, 170-2, 170-3, 170-4 and 170-5. The embodiments are not limited in this context.

The notification system 100 may comprise the notification engine 130. The notification engine 130 may be generally arranged to receive an event 115 from an online service, such as a social networking service 110, and to determine whether and how to communicate the event 115 to a subscriber 120 of the social networking service 110 using known delivery channels 170-a.

The notification engine 130 may comprise a channel component 140. The channel component 140 may be operative to receive an event 115 from the social networking service 110 to communicate to a subscriber 120 of the social networking service 110. The notification engine 130 may determine or select one or more channels 145 of a plurality of channels 170-a to communicate the event 115 to the subscriber 120. This determination may be made according to rankings 150 associated with each channel 170-a, the rankings 150 specific to the subscriber 120, and according to subscriber history, among other factors.

The event 115 may comprise any piece of information the social networking service 110 determines relevant to or associated with the subscriber 120. It may correspond to a change, issue, or development related to an account for the subscriber 120 in the social networking service 110. The event 115 may correspond to a change, issue, or development related to a contact, friend, associate, or another defined relationship of the subscriber 120 on the social networking service 110. The event 115 may correspond to a development independent of the subscriber 120 which has an effect on the subscriber 120 or their profile, such as the date changing to a day on which the subscriber 120 has registered a social engagement with the social networking service 110, the event 115 therefore notifying them of the social engagement because of the change in date. In some embodiments, the notification engine 130 may comprise a component or part of the social networking service 110 or be maintained by the same provider as the social networking service 110. In other embodiments, the notification engine 130 may be distinct from the social networking service 110.

The channel component 140 may use channel rankings 150 to determine the one or more channels 145 to communicate the event 115 to the subscriber 120. A channel ranking may comprise an estimation of the weighted preference of the subscriber 120 for using that channel to communicate with them. For example, if a user has both a registered SMS channel and e-mail channel with the notification engine 130 the channel rankings 150 may represent a relative bias of the subscriber 120 for using the SMS channel versus using the e-mail channel. A subscriber 120 who desires to receive e-mails over SMSs would have a higher weighting on the e-mail channel over the SMS channel. The channel component 140 may select the channels 145 with a weight greater than a predefined threshold. The channel component 140 may be operative to always select at least the highest-weight channel of the plurality of delivery channels 170-a.

An event 115 may be of a particular type. In one embodiment, for example, the type may be one of security notice, profile activity, friend activity, and message. It will be appreciated that other types or categories of events may be used. The channel rankings 150 for a subscriber 120 may be global across the type of an event 115 or may be specific to a type of event 115. The channel rankings 150 may have both global weights and type-specific weights for each channel, such that for a specific event 115 the weights used to determine which channels 145 will be used may be a combination of the global weights and the type-specific weights for the type corresponding to event 115. The channel component 140 may therefore be operative to construct combined weights for each channel of the delivery channels 170-1 based on both global weights and type-specific weights, the constructed combined weights used to determine the channels 145 used to transmit event 115. Combining weights may comprise adding together the weights, averaging the weights, or any other known method of combining weights. In some embodiments, the type-specific weights may be pre-set according to global defaults to be higher for certain higher-priority types of events, such as security notices. Pre-setting the type-specific weight for security notices would increase the tendency of the channel component 140 to transmit security notices across a greater number of delivery channels.

In some embodiments, the channel component 140 may be operative to use a reduced weight for a delivery channel if the delivery channel has one or more notifications pending on the channel. The channel component 140 may be operative to reduce the weight of the delivery channel proportionately to the number of pending notifications, or may generally be operative to reduce the weight increasingly for each additional pending notification on the channel. In some embodiments, the channel component 140 may be operative to reduce the weight of a delivery channel if and only if the delivery channel has one or more notifications pending on the channel of the same type as event 115.

The channel rankings 150 may be determined according to subscriber history. Subscriber history may correspond to a complete or partial record of the interaction between subscriber 120 and social networking service 110 or notification engine 130 for a defined time period (e.g., days, weeks, years, etc.). For example, the channel rankings 150 may be higher for a particular delivery channel if the subscriber 120 has a subscriber history which indicates a preference for or a greater likelihood to respond to that delivery channel. The decision of whether and how to transmit an event 115 to a subscriber 120 may depend on the combined rankings, which may be dependent on a type of the event 115. As such, the decision of whether and how to transmit an event 115 to a subscriber 120 may depend on a correlation between the event 115 and the channel rankings 150.

In some embodiments, the channel component 140 may be operative to determine the one or more channels 145 based on the associated rankings 150 and one or more of preferences set by the subscriber 120, information about subscriber devices, subscriber presence on one or more devices, a current location, or a current date and time.

Subscriber preferences set by the subscriber 120 may correspond to explicitly-set preferences registered with the notification engine 130 or the social networking service 110. Preferences may comprise an explicit indication by the subscriber 120 that certain types of events should always be or should never be communicated via a particular delivery channel. Preferences may comprise an explicit indication by the subscriber 120 that certain delivery channels are preferred or are not preferred for the communication of events or for the communication of certain types of events.

Information about subscriber devices may comprise information about the current status of devices associated with the subscriber 120. For example, an SMS may not be sent to a particular subscriber mobile device if the mobile device is determined to be unpowered, have low battery power, or is otherwise unavailable on a cellular network. Similarly, a push notification may not be sent to an application if the device hosting the application is determined to be unavailable.

Subscriber presence may correspond to information indicating that a subscriber 120 is available for communication via a particular delivery channel. A delivery channel and device used on that channel may provide presence information, the presence information evidence for or against the subscriber being available for communicating via the delivery channel. For example, the subscriber responding to an e-mail may comprise evidence that the subscriber is present on an e-mail channel. A failed attempt to send a SMS message to a subscriber's device may provide evidence that the subscriber is not present on an SMS channel. A subscriber's presence status may comprise a determination by a presence system, such as may be included in channel component 140, of whether the subscriber is present on one or more delivery channels. In cases where the channel component 140 only has one piece of evidence regarding a subscriber's presence, that evidence may decide the presence status. In cases where the channel component 140 has multiple pieces of evidence regarding a delivery channel the evidence may be combined together to produce the presence status. For example, an instant messaging service may maintain a record of whether the subscriber 120 is present on the service. The channel component 140 may weight more heavily a delivery channel if the subscriber 120 is confirmed to be present on the delivery channel, or may remove a delivery channel from consideration if the subscriber 120 is confirmed to not be present on the delivery channel.

Current location may correspond to a current location of the subscriber 120. The location of a subscriber 120 may be determined according to one or more devices associated with a subscriber 120. For instance, a mobile device associated with subscriber 120 may have a Global Positioning System (GPS) unit capable of determining the mobile device's current location. The channel component 140 may be operative to be more likely to use a delivery channel which interrupts the subscriber 120—such as an SMS—if the subscriber 120 is in a location corresponding to the event 115.

The current date and time may correspond to the current date and time of the social networking service 110 or the subscriber 120. The channel component 140 may be operative to be more likely to use a delivery channel which interrupts the subscriber 120 if the notification 155 will be received during daylight, working, or waking hours.

In some embodiments, the received event 115 may be associated with a second subscriber, the subscriber 120 and second subscriber having a defined relationship in the social networking service 110. The second subscriber may specifically be a subscriber of the social networking service 110. A defined relationship may comprise any relationship that may be defined, represented, or registered with the social networking service 110. A defined relationship may comprise a friendship, working relationship, familial relationship, school relationship, friend-of-friend relationship, or any other type of defined relationship. The event 115 associated with a second subscriber may comprise, for example, the second subscriber sending a message to the subscriber 120, the second subscriber tagging the subscriber 120 in a photo, the second subscriber posting on a wall or profile of the subscriber 120, the second subscriber inviting the subscriber 120 to an event, the second subscriber inviting the subscriber 120 to join a group, the second subscribing liking or commenting on a post or piece of profile information of subscriber 120, or any other form of interaction associated with both subscriber 120 and the second subscriber.

In some embodiments, the plurality of delivery channels 170-a may comprise two or more of short message service (SMS), telephone, electronic mail (e-mail), push-based e-mail, internet message access protocol (IMAP) Idle notifications, Outlook mobile access (OMA) push notifications, instant message (IM), voice notifications through interactive voice response (IVR), unstructured supplementary service data (USSD) notifications, SIP notifications, web notifications, push notification to a mobile application, any other form of push notification, or any other technique for transmitting a notification 155 to a subscriber 120. The plurality of delivery channels 170-a may comprise any known form of electronic communication between a notification engine 130 and a subscriber 120.

The notification component 160 may be operative to construct a notification 155 based on the event 115 and to transmit the notification 155 to the subscriber using the determined one or more channels 145. Constructing a notification 155 may comprise translating the event 115 from a machine-readable format to a human-readable format. For example, the event 115 may be encoded in a data structure object while the notification 155 may be a text string with associated fields containing information relevant to the transmission and management of the communication of event 115 to the subscriber 120. The translation from event 115 to notification 155 by the notification component 160 may comprise a translation into a local language or preferred language of subscriber 120; for example, the event 115 may be stored according to a default language of social networking service 110 and translated into a language appropriate to subscriber 120 during the construction of notification 155. If a type of event is associated with event 115 then constructing notification 155 may comprise retrieving a text template associated with the type of event and modifying the text template—such as by filling blanks in the text template—with details of event 115.

Notification 155 may be constructed based on the channels 145 selected by the channel component 140. If multiple delivery channels are selected, notification 155 may be constructed in a plurality of instantiations, wherein each instantiation is specific to a delivery channel. For example, an SMS may have a limited number of characters, such that a notification 155 has a particular instantiation for an SMS channel distinct from an instantiation for an e-mail channel. An event 115 of a particular type may have a number of text templates specific to each of delivery channels 170-a, each of the text templates retrieved and modified according to event 115 once the channels 145 are selected by the channel component 140.

In some embodiments, the channel component 140 may be operative to determine two or more channels 145 of the plurality of channels 170-a, the notification component 160 operative to cancel the transmission of the event 115 on one of the two or more channels 145 in response to the successful transmission of the event 115 on another of the two or more channels 145. For example, if a subscriber 120 has open a web page for the social networking service 110 on a desktop computer, but is out of the house and has with them a mobile device capable of receiving SMS messages, then if the notification engine 130 were to transmit the notification 155 to the subscriber 120 via both web notification and SMS, and the user were to respond to the notification 155 from the SMS, then the notification component 160 may cancel the web notification in response to the successful SMS notification. As such, when the subscriber 120 returns home they would not see a web notification on their desktop computer for an event 115 to which they already responded.

In some embodiments, the notification component 160 may be operative to determine that one of the determined delivery channels 145 has had a failed delivery attempt, the channel component 140 operative to determine an additional delivery channel of the plurality of delivery channels 170-a to use to communicate the event 115 to the subscriber 120, the notification component 160 operative to transmit the notification 155 to the subscriber 120 using the determined additional delivery channel. The determination of the additional delivery channel may be performed according to the technique used for determining the initial set of channels 145 wherein the delivery channel with the failed delivery attempt is excluded from the set of possible delivery channels. In some embodiments, the notification component 160 may be operative to determine that two or more of the determined delivery channels 145 has had a failed delivery attempt and to determine an additional delivery channel in response. In some embodiments, the notification component 160 may be operative to determine that all of the one or more determined delivery channels 145 have had a failed delivery attempt and to determine an additional delivery channel in response.

In some embodiments, the channel component 140 may be operative to periodically reevaluate notification 155 if it has not yet been successfully transmitted to the subscriber 120. This reevaluation may occur on a set schedule, such as once an hour. The channel component 140 may be operative to reevaluate whether the one or more delivery channels 145 of the plurality of delivery channels 170-a is still the appropriate set of delivery channels. For instance, if a failed delivery channel of the one or more delivery channels 145 has had one or more failed delivery attempts, the channel component 140 may be operative to reduce the weight or ranking of the failed delivery channel in determining the one or more delivery channels 145 and to re-determine the one or more delivery channels 145 using the new weight or ranking for the failed delivery channel. As such, the channel component 140 may be operative to periodically reevaluate the status of the notification 155 and to determine a second set of one or more delivery channels of the plurality of delivery channels 170-a to communicate the event 115 to the subscriber 120, the second set of one or more delivery channels comprising at least one additional delivery channel that was not present in the one or more channels 145 initially determined. In general, the channel component 145 may be operative to re-valuate any of the determinations it has previously made during a periodic reevaluation.

In some embodiments, the channel component 140 may be operative to check the validity of one or more of the plurality of delivery channels 170-a in response to the received event 115 and to determine the one or more delivery channels 170-a to use to communicate the event 115 to the subscriber 120 according to the validity check. A validity check may comprise any analysis or calculating performed on a delivery channel to determine whether the delivery channel is associated with a subscriber 120.

For example, a subscriber 120 may register a phone number with the social networking service 110. Over time a subscriber 120 may change their phone number. However, the subscriber 120 may not think to inform the social networking service 110 that their phone number has changed or that the phone number they registered with the social networking service 110 is no longer valid. As such, the social networking service 110 may wish to gather information which may indicate whether or not a phone number is still associated with a subscriber 120. This may be generalized to other delivery channels. The channel component 140 may therefore be operative to perform checks on a registered delivery channel to determine whether it is still a valid delivery channel. The channel component 140 may therefore be operative to only include those delivery channels with a positive validity check, or only those delivery channels without a negative validity check, in its consideration of determining channels 145.

Figure 2:
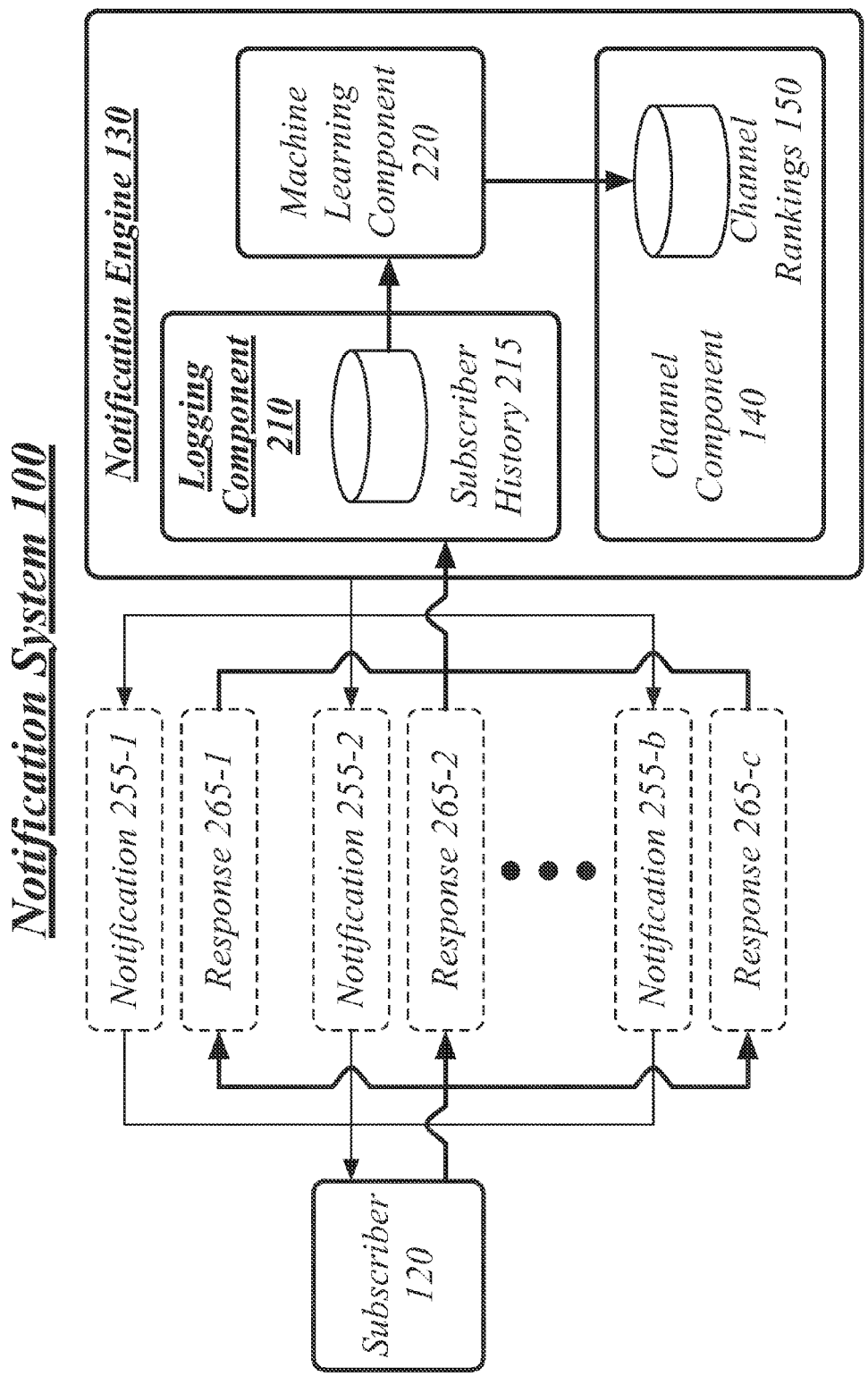
FIG. 2 illustrates a second embodiment of a notification system including a logging and machine learning component.

FIG. 2 illustrates a second block diagram for a notification system 100. The notification engine 130 may comprise a logging component 210 and a machine learning component 220.

A logging component 210 may be operative to record subscriber responses 265-c to prior notifications 255-b, the recorded responses 265-c comprising the subscriber history 215. The subscriber 120 may carry out a plurality of interactions with notification engine 130 or social networking service 110, which may be recorded by logging component 210 into subscriber history 215. In particular, this plurality of interactions may correspond to a plurality of notifications 255-b sent to subscriber 120 and a plurality of responses 265-c received from the subscriber 120. It will be appreciated that as the notification engine 130 may be working on behalf of social networking service 110, that the responses 265-c may be responses 265-c in which the subscriber 120 responded to a notification by contacting the social networking service 110.

It will further be appreciated that not every response 265-c from the subscriber 120 may correspond to the reception of a communication from subscriber 120 by the notification engine 130 or the social networking service 110. Particularly, the failure or declination of a subscriber 120 to respond to a notification 155 may be considered as valuable a piece of information as the success or choice of a subscriber 120 to respond to a notification 155 in that either may reflect the respective disinclination or preference of the subscriber 120 for receiving notifications about a particular type of event, notification via a particular delivery channel 170-a, or notifications about a particular type of event via a particular delivery channel 170-a. As such, the responses 265-c recorded in subscriber history 215 may comprise, for each notification 255-b sent to the subscriber 120, whether or not the subscriber 120 responded to the notification 155, which channel of the delivery channels 170-a they responded to, and the time between the transmission of the notification 155 and the received response.

The delivery channel 170-a over which the subscriber 120 responded may be determined according to a number of different methods. Over a text-based delivery channel such as SMS, e-mail, or IM the notification 155 may include a URL specific to the channel such that the subscriber 120 opening the URL indicates to the social networking service 110 which delivery channel was responsible for the subscriber 120 responding. Over a delivery channel capable of carrying a response—such as SMS, telephone, e-mail, IM, push notification, or web notification—the delivery channel responsible for the subscriber 120 responding may be indicated by the subscriber's response being returned over that delivery channel.

A machine learning component 220 may be operative to determine the associated rankings 150 according to the recorded responses in the subscriber history 215. Each delivery channel 170-a may have associated with it a channel ranking 150. The machine learning component 220 may be operative to set the starting weights for each delivery channel 170-a according to default weights for the social networking service 110. The machine learning component 220 may be operative to adjust the weights for each delivery channel 170-a based on the subscriber history 215. The machine learning component 220 may be operative to adjust weights which are specific to a delivery channel but global across type of event, to adjust weights which are specific to a type of event but global across delivery channel, and to adjust weights which are specific to both delivery channel and type of event. These weights may be combined together during the determination of the channels 145 by channel component 140.

The machine learning component 220 may be operative to increase the weight of a delivery channel 170-a if a response 265-c is received for a notification 255-b sent across delivery channel 170-a. The machine learning component 220 may be operative to decrease the weight of a delivery channel 170-a if a response 265-c is not received for a notification 255-b sent across delivery channel 170-a. The machine learning component 220 may be operative to increase the weight of a delivery channel 170-a for a specific type of notification if a response 265-c is received for a notification 255-b of that type sent across delivery channel 170-a. The machine learning component 220 may be operative to decrease the weight of a delivery channel 170-a for a specific type of notification if a response 265-c is not received for a notification 255-b of that type sent across delivery channel 170-a.

The machine learning component 220 may be operative to increase the weight of a delivery channel 170-a if the subscriber 120 indicates that a delivery channel 170-a is preferred via explicitly set subscriber preferences. The machine learning component 220 may be operative to decrease the weight of a delivery channel 170-a if the subscriber 120 indicated that a delivery channel 170-a is not preferred via explicitly set subscriber preferences.

The process of adjusting and setting channel rankings 150 may be performed according to any one of the known methods or algorithms for machine learning. For example, the preferences of a subscriber 120 for receiving a particular type of notification 255-b over a particular delivery channel 170-a may be expressed as a probability within a Bayesian network wherein an event 115 being of a particular type and being transmitted over a particular delivery channel 170-a are the inputs and the subscriber 120 responding or not is the output. However, other methods may be used.

Figure 3:
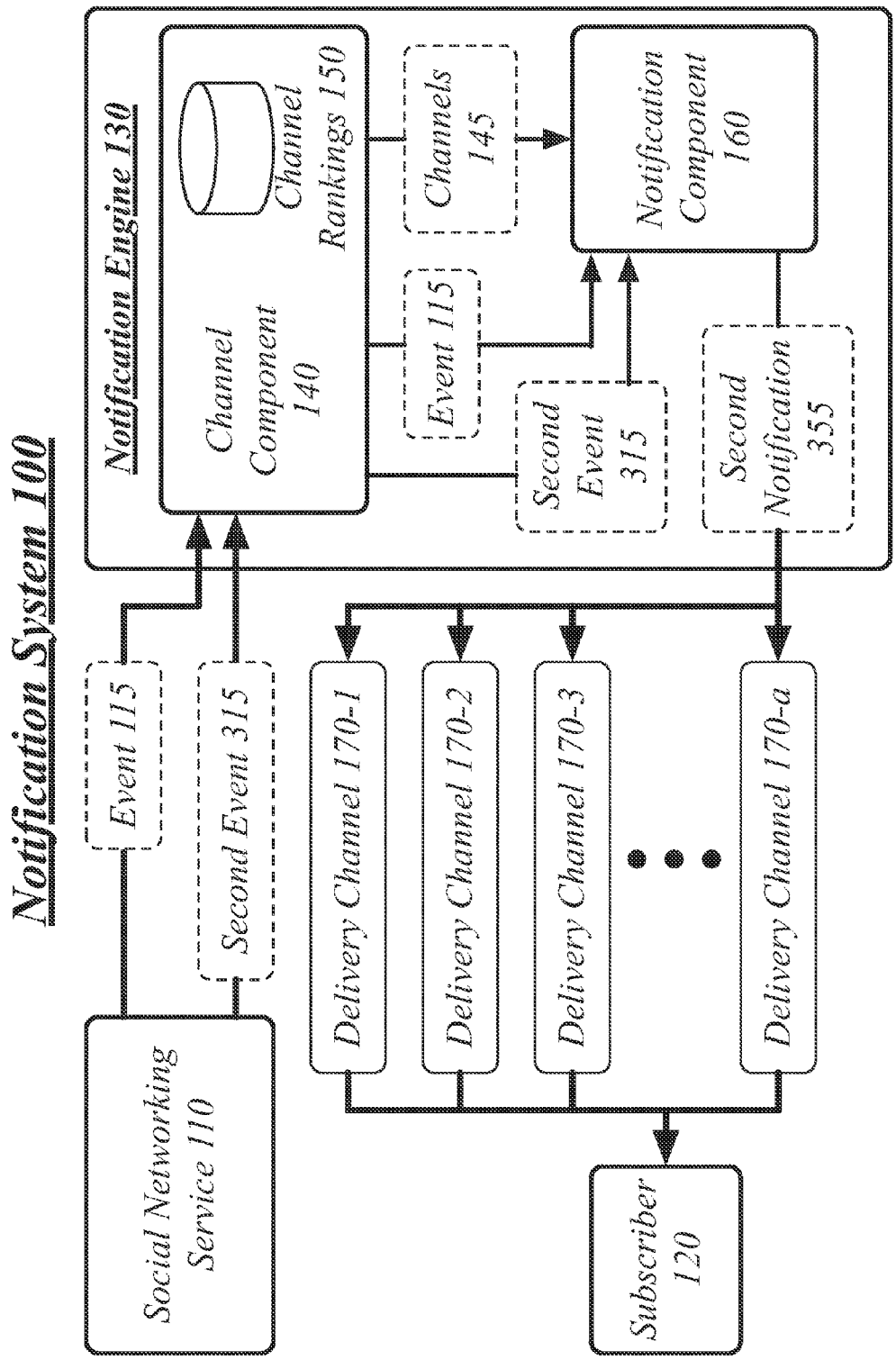
FIG. 3 illustrates a third embodiment of a notification system including a second event for transmission to a subscriber.

FIG. 3 illustrates a third block diagram for a notification system 100. The notification engine 130 may face a situation in which a second event 315 is received by the channel component 140 while an event 115 is still in the process of being communicated to the subscriber 120 via one or more delivery channels 170-a.

In some embodiments, the channel component 140 may be operative to receive a second event 315 associated with the subscriber 120 and to determine to communicate the second event 315 to the subscriber 120, the notification component 160 operative to combine the event 115 and the second event 315 into a second notification 355, the second notification 355 replacing the notification 155 for transmission to the subscriber. Upon receiving the second event 315 the channel component 140 may be operative to determine that the notification 155 has not yet been successfully delivered to the subscriber 120 and to determine that the event 115 and second event 315 may be combined together for communication to the subscriber 120. In some embodiments, two events may be combined together whenever more than one event is pending for a subscriber 120, whenever more than one event of the same type is pending for a subscriber 120, or whenever more than one event is pending for a subscriber 120 across a particular delivery channel.

Combining together two events into second notification 355 may comprise constructing a digest notification using a digest template for communicating multiple events. A digest template may comprise a text string with places for inserting text related to both the type of event and the specific event being communicated. Alternatively, the second notification 355 may comprise two notifications concatenated together such that the complete text for both is transmitted across the selected delivery channel(s).

Figure 4:
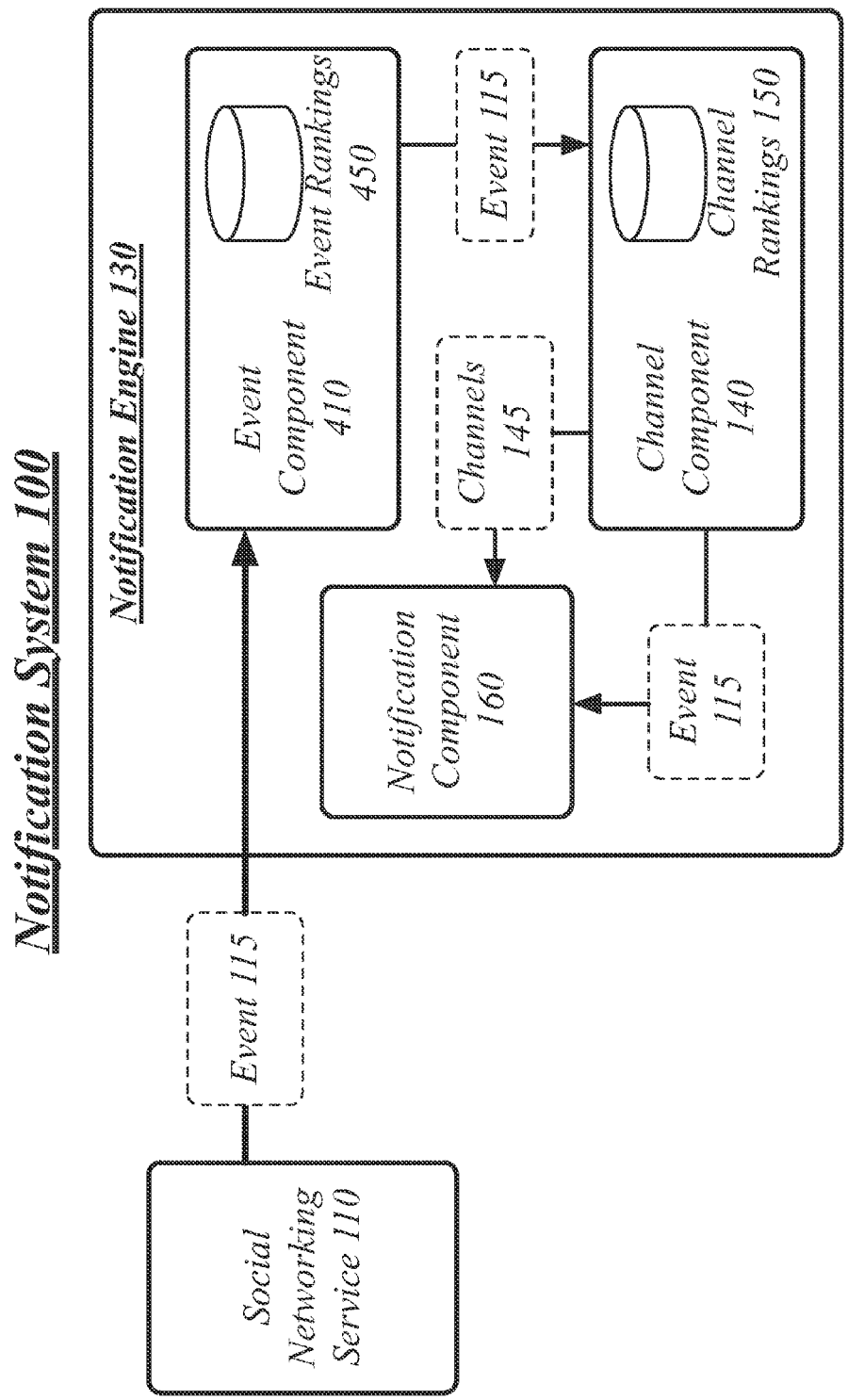
FIG. 4 illustrates a fourth embodiment of a notification system including an event component.

FIG. 4 illustrates a fourth block diagram for a notification system 100. The notification engine 130 may comprise an event component 410 with event rankings 450.

An event component 410 may be operative to receive the event 115, the event 115 associated with the subscriber 120 and comprising a type of event, the event component 410 operative to determine to communicate the event 115 to the subscriber 120 based on a ranking 450 specific to the subscriber 120 and to the type of event. In general the event rankings 450 may be generally similar to the channel rankings 150 in that they may include default rankings, subscriber-specific rankings, event-specific rankings, and combinations thereof.

The determination by the event component 410 of whether to communicate the event 115 based on the event rankings 450 may be accomplished according to a variety of techniques. The event rankings 450 may include a general subscriber-specific weight which indicates a general weighting of whether subscriber 120 wishes to receive notification of events. The event rankings 450 may include type-specific weights which indicate whether subscriber 120 wishes to receive notification of a particular type of event. The event component 410 may be operative to combine together these weights to produce a combined weighting for a particular event 115. The event component 410 may be operative to transmit those events whose combined weights exceed a predefined threshold.

Additionally or alternatively, the functions of event component 410 may be combined with the functions of channel component 140. For example, the channel rankings 150 may be the same as event rankings 450 such that for each event 115 a weight is produced for that event 115. The event 115 may be transmitted to subscriber 120 only if the combined weight for a particular delivery channel of the delivery channels 170-a exceeds a threshold and will be transmitted across all channels 145 whose associated combined weights exceed the threshold.

The event rankings 450 may be determined through a process substantially similar to the determination of the channel rankings 150. The machine learning component 220 may be operative to increase the weight in the event rankings 450 for a type of event if a response 265-c is received for a notification 255-b of that type. The machine learning component 220 may be operative to decrease the weight in the event rankings 450 for a type of event if a response 265-c is not received for a notification 255-b of that type.

In some embodiments, the freshness of an event 115—the time since the occurrence of the event 115—may be a factor in whether or not the event 115 is communicated to the subscriber 120. The event component 410 may be operative to be more likely to communicate an event 115 to the subscriber 120 if it is fresher and less likely to communicate the event 115 to the subscriber 120 if it is less fresh. As such, the event component 410 may be operative to determine to communicate the event 115 to the subscriber 120 based on a ranking 450 specific to the subscriber 120 and to the type of event and based on an amount of time since an occurrence of the event 115.

In some embodiments, the event component 410 may be operative to periodically reevaluate event 115 if it has not yet been successfully transmitted to the subscriber 120. This reevaluation may occur on a set schedule, such as once an hour. In some cases, the event component 410 may be operative to perform this reevaluation in sync with or in coordination with a reevaluation performed by the channel component 140. The event component 410 may be operative to reevaluate whether event 115 should still be communicated to the subscriber 120 given the passage of time and the possible failure to deliver the event 115 to the subscriber via a notification 155. Therefore, on re-evaluation an event 115 that the event component 410 once indicated should be communicated may be determined to no longer be sufficiently relevant and the event component 410 may determine not to communicate the event 115 to the subscriber 120. As such, the event component 410 may be operative to periodically reevaluate the status of the event 115 and to determine whether to communicate the event 115 to the subscriber 120 based on a ranking 450 specific to the subscriber 120 and to the type of event and based on a second amount of time since an occurrence of the event 115, the second amount of time larger than the amount of time used in the initial determination to communicate the event 115. In general, the event component 410 may be operative to re-valuate any of the determinations it has previously made during a periodic reevaluation.

In some embodiments, the event component 410 may be operative to use a reduced weight for the general subscriber-specific weight or for the event-specific weights if the subscriber 120 has one or more notifications pending. The event component 410 may be operative to use a reduced subscriber-specific weight if the subscriber 120 has one or more notifications pending. The event component 410 may be operative to use a reduced type-specific weight if the subscriber 120 has one or more notifications pending of that type. The event component 410 may be operative to reduce a weight proportionately to the number of pending notifications, or may generally be operative to reduce the weight increasingly for each additional pending notification on the channel. As such, the subscriber 120 may be protected from being bombarded by a large number of notifications when they access them.

Figure 5:
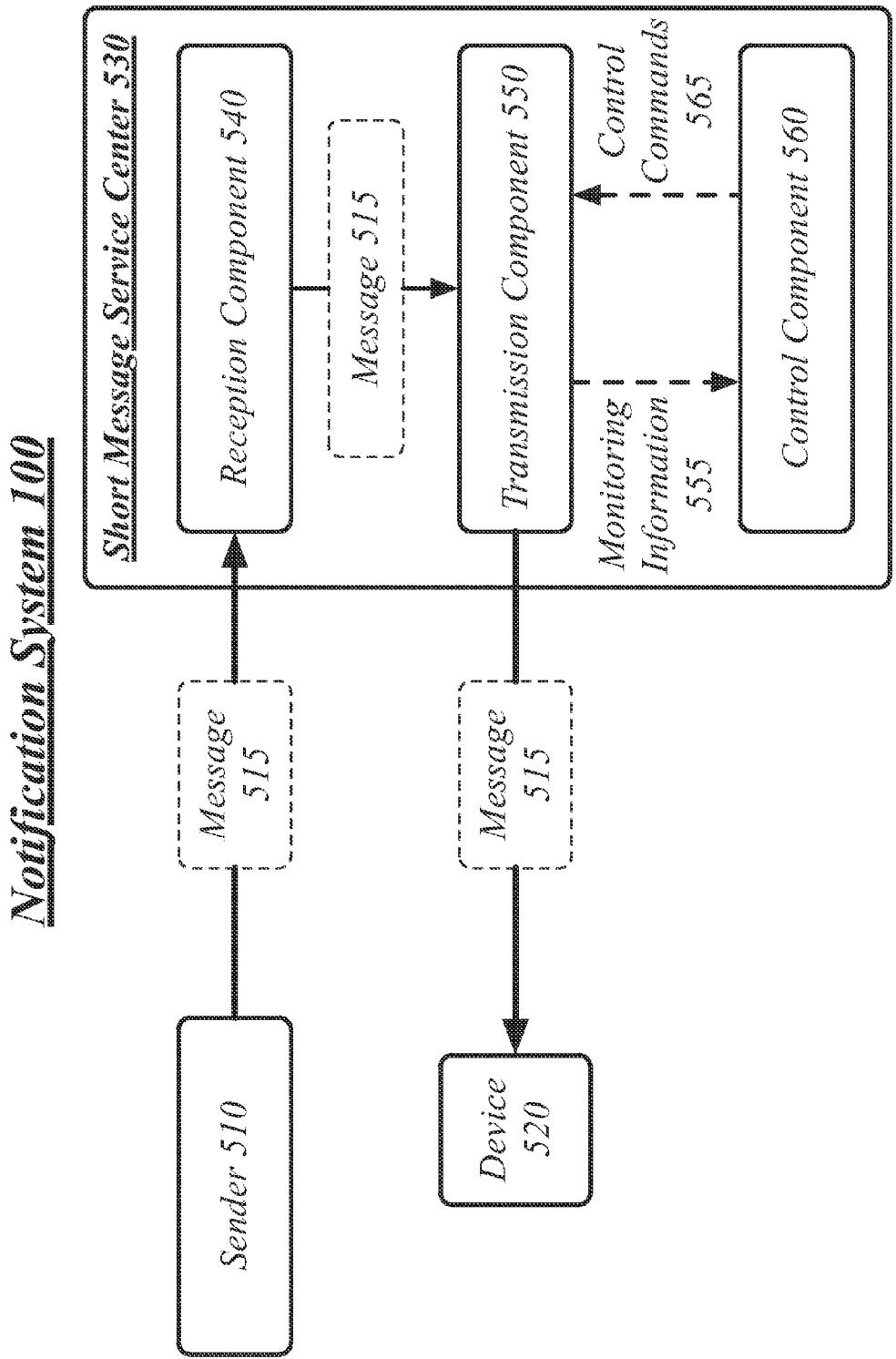
FIG. 5 illustrates a short message service center for use as part of the notification system.

FIG. 5 illustrates a short message service center 530 for use as part of the notification system 100. The short messages service center (SMSC) 530 may comprise a reception component 540, a transmission component 550, and a control component 560.

The reception component 540 may be operative to receive a short message service (SMS) message 515 for communication to a device 520 from a sender 510. Receiving a SMS message 515 from a sender 510 may comprise the sender transmitting a text-encoded string comprising the human-readable message for the user of device 520 along with a phone number identifying the device 520. Unlike traditional SMSCs, the SMSC 530 may be operative to receive, send, forward, manage, and otherwise process SMS messages on behalf of applications, such as a social networking service 110.

Sender 510 could comprise a variety of different types of senders. In some cases, sender 510 may be an individual—or a device such as a mobile phone acting on behalf of an individual—desiring to send an SMS message to device 520. Alternatively, sender 510 may be a computer system not associated with a particular individual. Sender 510 may be a gateway or SMSC of another cellular provider, the sender 510 transmitting the message 515 to the SMSC 530 for forwarding to a device 520 served by SMSC 530. Sender 510 may be a server or server system that uses SMS messages to communicate with users or subscribers, such as notification engine 130. In any of these cases, the SMSC 530 may be operative to receive message 515 from the sender 510, to attempt delivery to the device 520, to send feedback about the delivery process to the sender 510, and to receive commands to modify or cancel the delivery from sender 510.

The transmission component 550 may be operative to initiate transmission of the message 515 to the device. The transmission of the message 515 to the device 520 may be accomplished according to one of a variety of methods. The message 515 may specify a phone number identifying the device 520, the phone number used to retrieve routing information for the device 520, the routing information used by the transmission component 550 to transmit the message 515 to the device 520. If the device 520 is a mobile device belonging to or subscriber to a cellular network maintained by the operator of the SMSC 530, meaning that the message 515 is an intra-operator message, then the routing information for the device 520 may be stored by the SMSC 530 and directly accessible by the transmission component 550. If the device 520 is a mobile device belonging to or subscriber to a cellular networking maintained by a different operator than the operator of SMSC 530, then the transmission component 550 may be operative to request the routing information from the SMSC of the cellular network to which the device 520 belongs. Alternatively, the transmission component 550 may be operative to transmit the message 515 to the SMSC of the cellular network to which the device 520 belongs.

The control component 560 may be operative to monitor the transmission of the message 515 to the device 520. Monitoring the transmission of the message 515 may comprise the control component 560 maintaining an active record of whether the message 515 has been successfully delivered to device 520, whether the transmission component 550 has had a failed delivery attempt of the message 515 to the device 520, and if so, how many failed delivery attempts. In the case of failed delivery attempts, the control component 560 may be operative to record information indicating the reason for the failed delivery, such as a device being registered with a cellular network or Subscriber Presence and Profile Database (SPPD) as being turned off, a device not being registered as being turned off but nevertheless not being able to be found in the cellular network, or a device being found in the cellular network but failing to successfully respond to a transmission attempt. The control component 560 may be further operative to monitor whether a transmission by the transmission component 550 to the device 520 has been cancelled or delayed due to the transmission component 550 determining that the device is in a state, such as roaming, indicating that transmission should be delayed or cancelled. The monitoring by the control component 560 may comprise the control component receiving monitoring information 555 from the transmission component 550 and sending control commands 565 to the transmission component 550.

Figure 6:
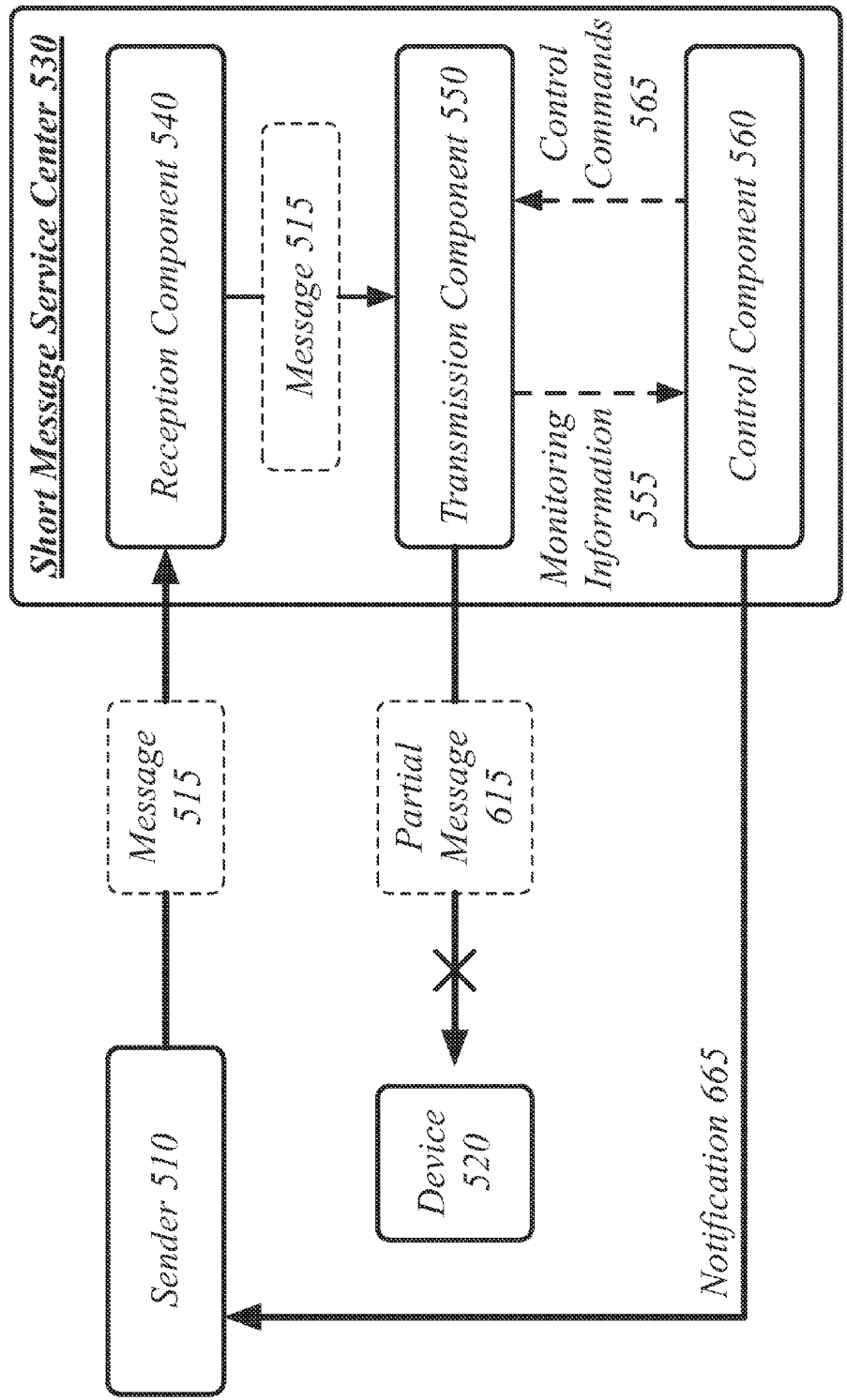
FIG. 6 illustrates a second embodiment of a short message service center which includes the failed delivery of a partial message.

FIG. 6 illustrates a second embodiment of a short message service center 530 for use as part of the notification system 100 which includes the failed delivery of a partial message 615.

The transmission component 550 may be operative to transmit a partial message 615 to the device 520 and to determine that the partial message 615 was not delivered to the device 520, the control component 560 operative to notify the sender 510 that the device 520 is not available in response to the partial message 615 not being delivered.

A partial message 615 may comprise a message containing routing information for the device 520 but without a message body for the user of device 520. The partial message 615 may comprise a metadata command or command in the header of the partial message 615 to indicate to the device 520 that a response is requested, such as by sending the "AT" console command in order to request a corresponding "OK" signal from the device 520. Determining that the partial message 615 was not delivered to the device 520 may comprise the transmission component 550 calculating that a sufficient period of time has passed since the transmission of the partial message 615 to the device 520 without a response being received to indicate that the device 520 is available, such as through the expiration of a time-to-live (TTL) timer.

The control component 560 may be operative to transmit a notification 665 to the sender 510 indicating that the device 520 is not available in response to the partial message 615 not being delivered. This may comprise a message containing a string, number, or other identifier indicating a failed delivery attempt along with an identifier for message 515.

The partial message 615 may comprise an attempt by the transmission component 550 to determine the availability of device 520 prior to sending message 515 and may comprise a regular part of the transmission of messages to devices. In response to a successful delivery of partial message 615 the transmission component 550 may be operative to automatically send the message 515 to the device 520. In some embodiments, the transmission component 550 may be operative to periodically attempt to resend the partial message 615 in order to determine the availability of device 520 to receive message 515 until the partial message 615 is successfully received. In these embodiments, the control component 560 may be operative to repeatedly send notifications like notification 665 to the sender 510 in order to update them on the progress of establishing that device 520 is available to receive message 515. These notifications may include information regarding the number of failed partial messages if multiple partial messages have been sent without response.

Figure 7:
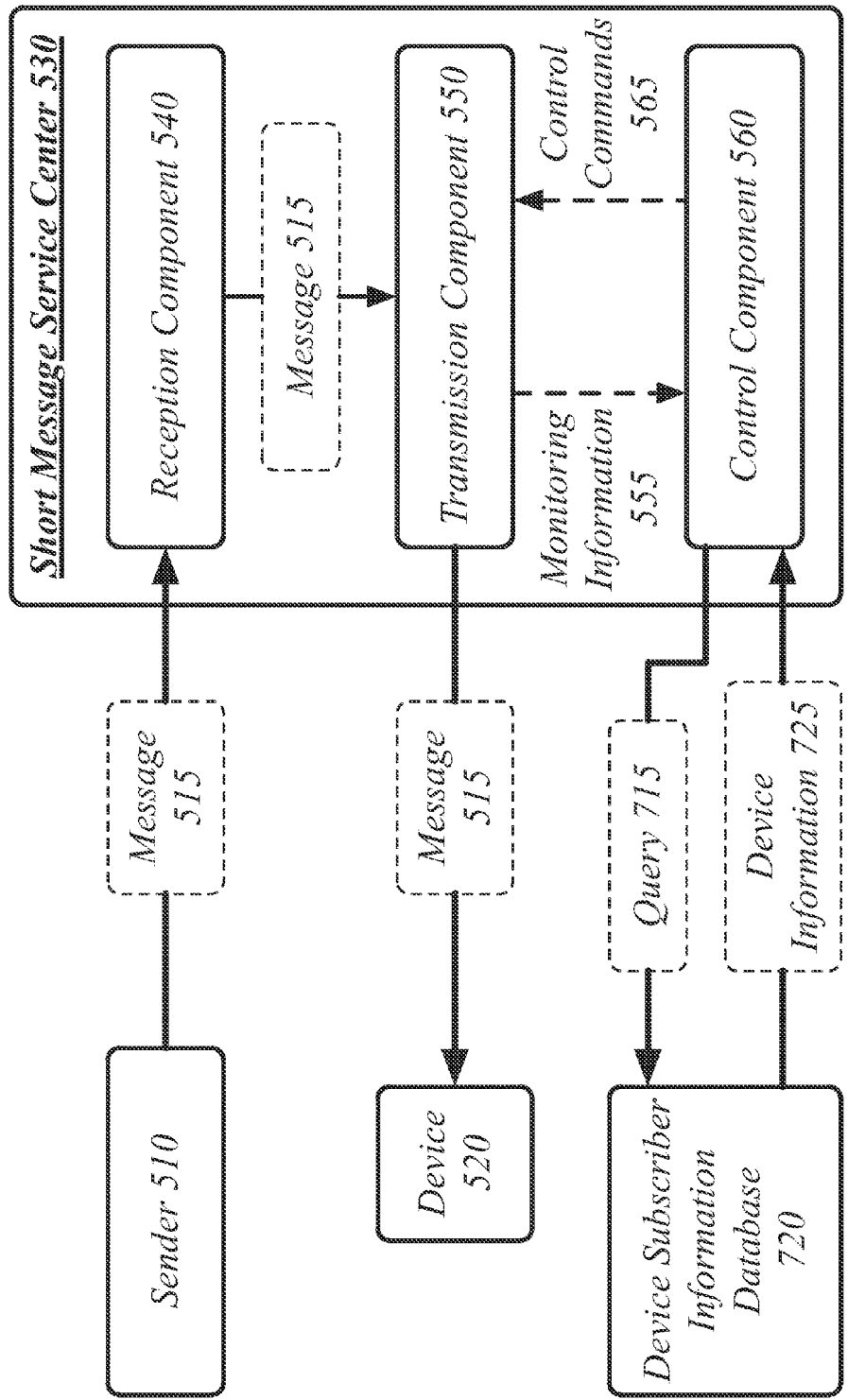
FIG. 7 illustrates a third embodiment of a short message service center which includes a query and response with a device subscriber information database.

FIG. 7 illustrates a third embodiment of a short message service center 530 for use as part of the notification system 100 which includes a query 715 and response with a device subscriber information database 720.

In some embodiments, the sender 510 may be a notification engine 130 for a social networking service 110, the received message 515 comprising a notification 155 to a subscriber 120 of the social networking service 110. In these embodiments, the SMSC 530 may comprise a controller or gateway used by the notification component 160 in order to access one of the delivery channels 170-a. The SMSC 530 may be operative to transmit, manage, modify, or cancel SMS messages on behalf of the notification component 160 either independently or of in response to commands from the notification component 160. The SMSC 530 may be operative to transmit status information about in-progress messages back to the notification component 160, to notify the notification component 160 of successful deliveries to subscribers, and to notify the notification component 160 of failed delivery attempts.

The control component 560 may be operative to query a device subscriber information database 720 of device subscriber information for device information 725 of the device 520 prior to transmission of the message 515 to the device, to analyze the device information 725 to determine that the device 520 is associated with the subscriber 120, and to allow transmission of the message 515 to the device 520 based on determining that the device 520 is associated with the subscriber 120. The control component 560 may also be operative to query the device subscriber information database 720 of device subscriber information for device information 725 of the device 520 prior to transmission of the message 515 to the device 520, to analyze the device information 725 to determine that the device 520 may not be associated with the subscriber 120, and to cancel transmission of the message 515 to the device 520 based on determining that the device 520 is associated with the subscriber 120.

In some cases, a subscriber 120 may register a phone number with social networking service 110, eventually change phone numbers, and fail to inform the social networking service 110 that their phone number has changed. If the SMSC 530 can detect that the phone number has changed then the social networking service 110 can refrain from using the phone number as a delivery channel in order to avoid annoying the new owner and potentially violating the privacy of the subscriber 120. The SMSC 530 may be operative to automatically perform this on behalf of the social networking service 110 or may be operative to perform this in response to a request from the social networking service 110.

The device subscriber information database 720 may comprise a Subscriber Presence and Profile Database (SSPD) such as a Home Location Register (HLR), Home Subscriber Server (HSS), or User Profile Server Function (UPSF) maintained by a cellular provider. The control component 560 may be operative to send a query 715 to the SSPD comprising the phone number associated with the device 520. In some cases, the phone number may also be referred to as a Mobile Subscriber Integrated Services Digital Network-Number (MSISDN). In response to the query 715, the control component 560 may receive device information 725 which may comprise information about the device 520. The device information 725 may include an Integrated Circuit Card Identifier (ICCID) (e.g. an International Mobile Subscriber Identity (IMSI)), which is a unique identifier for the subscriber identity module (SIM) assigned to each device. The control component 560 may be operative to compare the ICCID for device 520 to a previously-recorded ICCID for the device 520. If the ICCIDs match, then that indicates that the same SIM card is associated with the phone number as before which may indicate that the device 520 is still associated with subscriber 120. If the ICCIDs do not match, then that indicates that a new SIM card is associated with the phone number, which may indicate that a new phone is associated with the phone number. In the case where a new phone device is associated with the phone number the control component 560 may determine that the device 520 may not be associated with the subscriber 120, and as such may cancel transmission of the message 515 to the device 520.

It will be appreciated that instead of performing the validation, allowance, or cancelling of messages based on information retrieved from the device subscriber information database 720 that the control component 560 may provide the device information 725 to the sender 510 in order to allow the sender 510 (such as social networking service 110 or notification engine 130) to determine whether to allow transmission of the message 515 or to cancel transmission of the message 515 using the SMSC 530. This providing of device information 725 to the sender 510 may be performed automatically in response to a message 515 being queued with the SMSC 530 or may in response to a request by the sender 510 to receive device information 725. It will be appreciated that, also, in some embodiments the notification engine 130 may perform the request and retrieval of device information 725 from the device subscriber information database 720 and directly perform the analysis as described for the control component 560.

Figure 8:
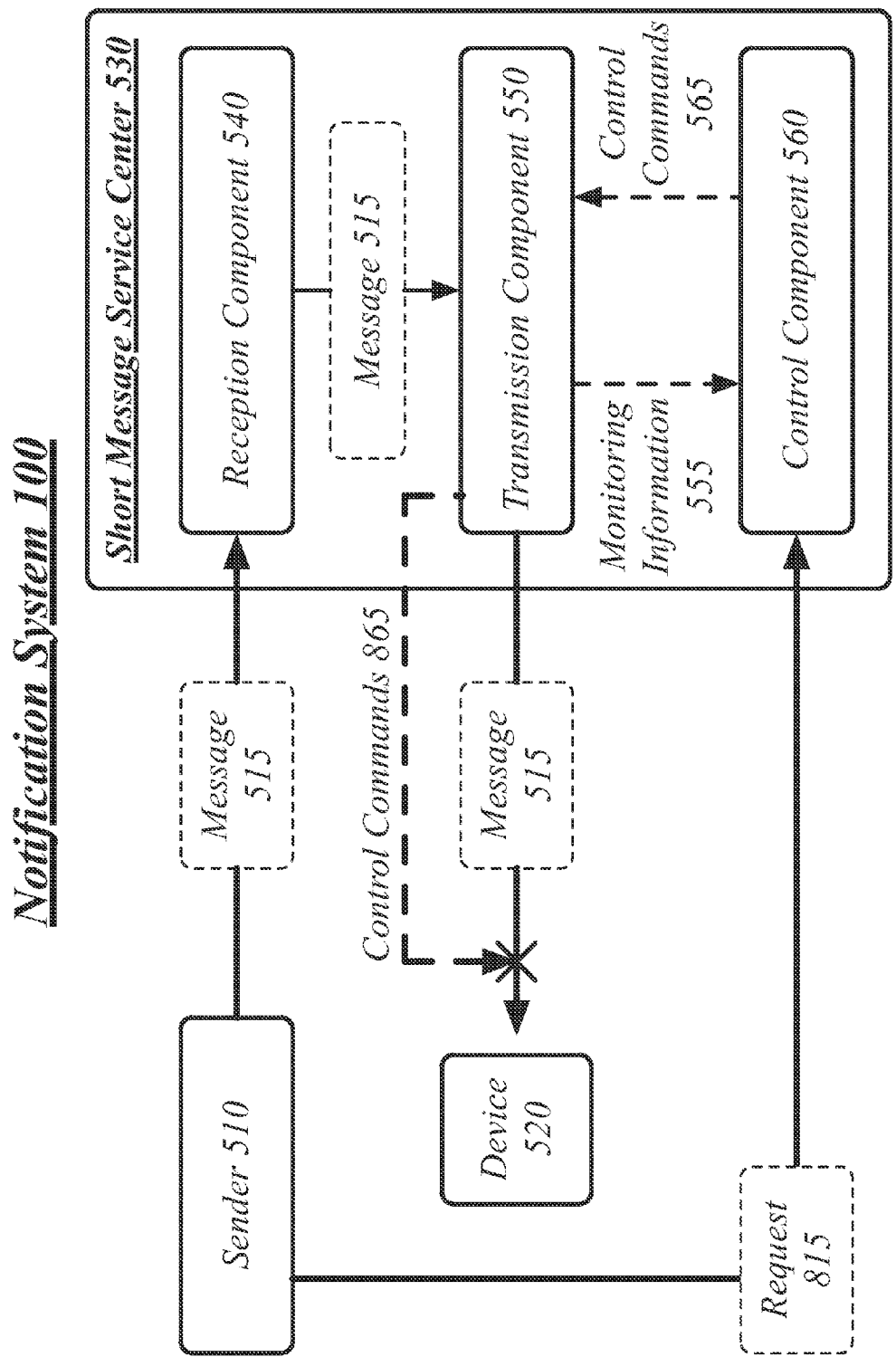
FIG. 8 illustrates a fourth embodiment of a short message service center which includes a request from a sender to cancel the transmission of message.

FIG. 8 illustrates a fourth embodiment of a short message service center 530 for use as part of the notification system 100 which includes a request 815 from the sender 510 to cancel the transmission of message 515 to device 520.

The control component 560 may be operative to receive a request 815 from the sender 510 to cancel the transmission of the message 515 to the device 520, the transmission component 550 operative to cancel the transmission of the message 515 to the device 520 in response to the received request 815. The request 815 may comprise a command sent from sender 510 to the SMSC 530 along the same channel of communication as message 515, the command comprising an identifier for message 515 along with a code indicating that message 515 should be cancelled if possible.

In some cases, the sender 510 may desire to cancel an in-progress message 515 from being delivered to device 520. If sender 510 is a notification engine 130 for social networking service 110 the notification engine 130 may cancel the message 515 from being sent via SMS by SMSC 530 for a variety of reasons: because the content of message 515 was communicated to subscriber 120 via another delivery channel of delivery channels 170-a, because the content of message 515 is no longer relevant to subscriber 120, because the social networking service 110 wishes to combine the content of message 515 with another notification into a digest notification, or to service any other function of social networking service 110.

Cancelling the transmission of message 515 to device 520 may comprise dequeueing the message 515 from a send or re-send queue of transmission component 550. A send queue of transmission component 550 may comprise a queue used to manage the order of the transmission of messages to devices. A re-send queue of transmission component 550 may comprise a queue used to manage the order of reattempting the transmission of messages with failed attempts to send or with failed attempts to send a partial message. In general, the control component 560 may be operative to use control commands 565 to instruct transmission component 550 to cancel sending message 515 to device 520 if message 515 has not been successfully sent, which may comprise cancelling the first attempt to transmit message 515 to device 520 or may comprise cancelling a re-try attempt to transmit message 515 to device 520.

Figure 9:
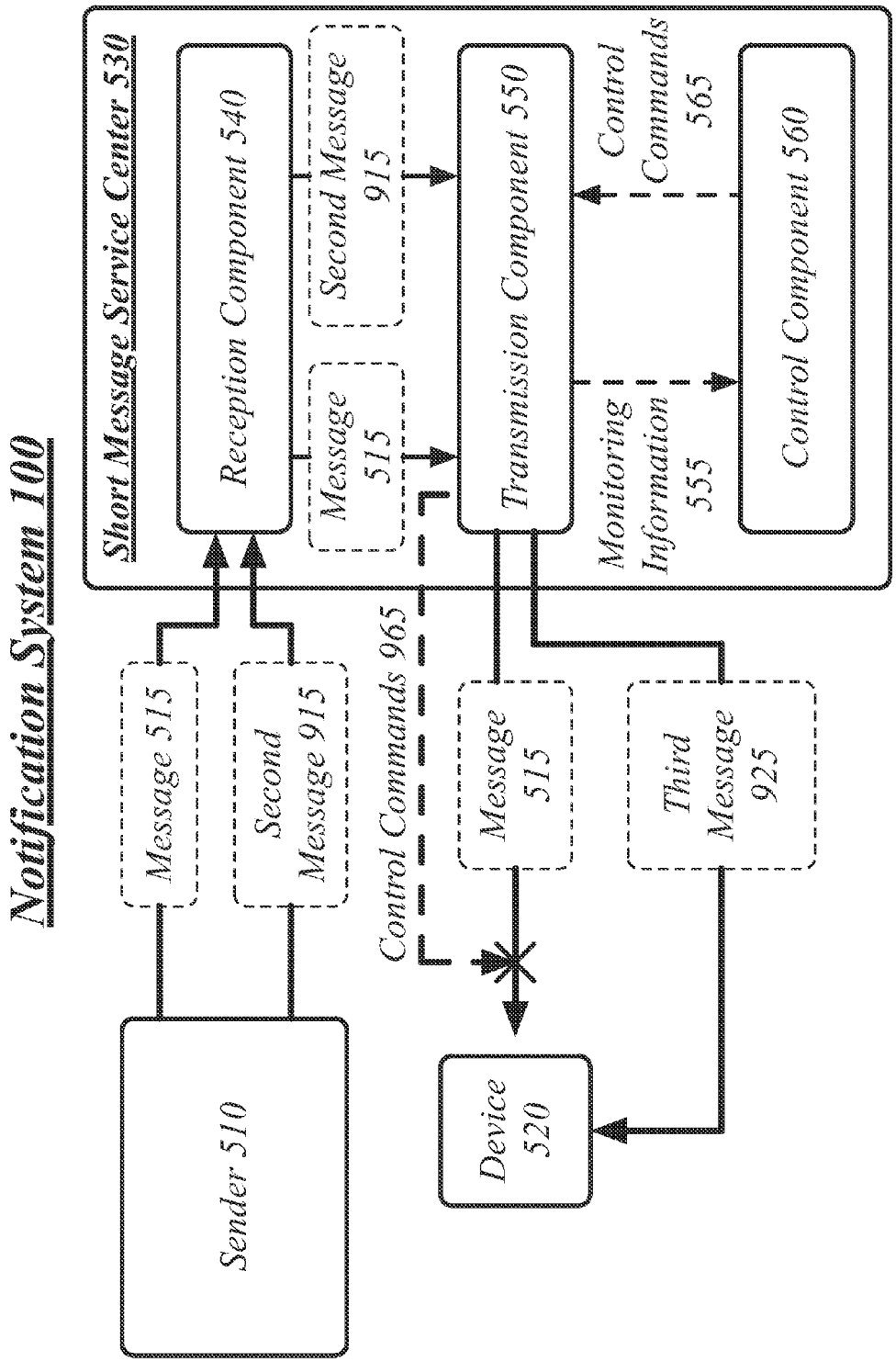
FIG. 9 illustrates a fifth embodiment of a short message service center which includes a second message being combined with first message.

FIG. 9 illustrates a fifth embodiment of a short message service center 530 for use as part of the notification system 100 which includes a second message 915 being combined with message 515 for transmission to the device 520.

The reception component 540 may be operative to receive a second SMS message 915 for communication to the device 520 from the sender 510, the control component 560 operative to combine the message 515 and the second message 915 into a third message 925, the transmission component 550 operative to replace the message 515 with the third message 925 for transmission to the device 520. Upon the reception component 540 receiving the second message 915, the control component 560 may be operative to determine that the message 515 has not yet been delivered to device 520, and that it should combine the two messages together in response. In some embodiments, two or more messages may be combined together whenever more than one message is pending for a device 520, whenever more than one message of the same type (such as an event type for a social networking service 110) is pending for a device 520, whenever more than one message is pending for a device 520 from a particular sender 510, or a combination of the two. In some embodiments, the control component 560 may be operative to combine the messages together based on a request from the sender 510 to do so or may determine that two messages queued which may be combined together, to query the sender 510 to determine if the messages should be combined together, and to combine the messages together in the case of an affirmative response to the query.

Combining together two messages into third message 925 may comprise constructing a digest message using a digest template for communicating multiple messages. A digest template may comprise a text header indicating that the third message is a digest message followed by the text of both messages.

Figure 10:
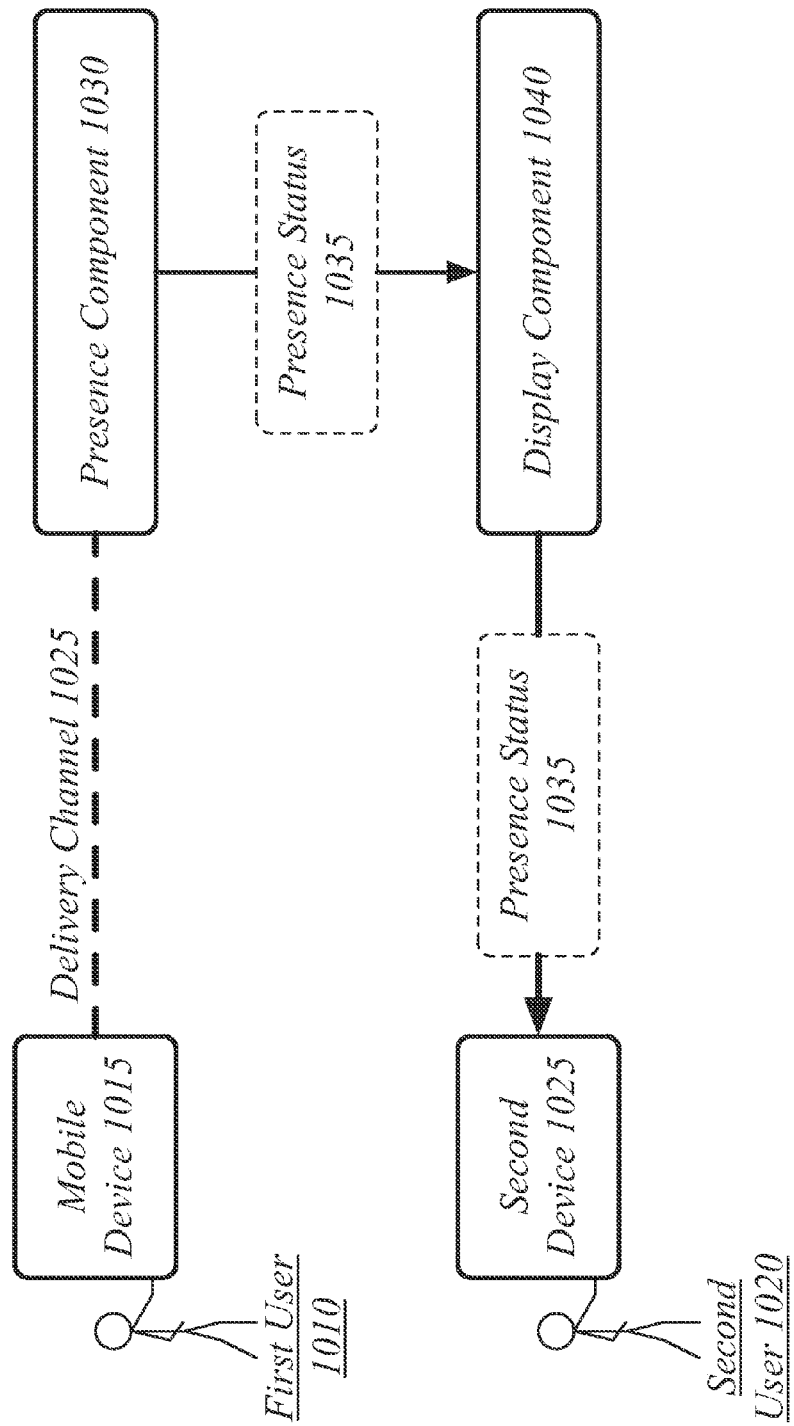
FIG. 10 illustrates an embodiment of a presence system.

FIG. 10 illustrates an embodiment of a presence system 1000 for use with notification system 100. The presence system 1000 may comprise a presence component 1030 and a display component 1040. The presence system 1000 may comprise a sub-component of channel component 140 of notification engine 130.

The presence system 1000 may specifically be operative to monitor the presence status 1035 of a first user 1010 on a mobile device 1015 across delivery channel 1025. In some embodiments, the mobile device 1015 may comprise a mobile phone, wherein the delivery channel 1025 comprises an SMS channel, the presence status 1035 is an indicator of whether first user 1010 is available on an SMS channel.

The presence component 1030 may be operative to determine whether a first user 1010 is present to receive SMS messages on a mobile device 1010. First user 1010 may be considered present if there is affirmative information that first user 1010 is at mobile device 1015 and capable of responding to messages, or may correspond to mobile device 1015 being available to receive messages.

Determining whether first user 1010 is present may comprise any of the known techniques for determining presence. For example, the presence component 1030 may contact mobile device 1015 over delivery channel 1025 and determine that first user 1010 is present on mobile device 1015 because it receives a response from mobile device 1015, such as an automatic response to a message. Alternatively, presence component 1030 may keep a record of information indicating whether or not first user 1010 is present on mobile device 1015—such as logs of communications and communication attempts with mobile device 1015—and use the log to determine the presence status 1035 of first user 1010. For example, presence component 1030 may determine that first user 1010 is present on mobile device 1015 if the most recent communication or communication attempt with mobile device 1015 was successful and may determine that first user 1010 is not present on mobile device 1015 if the most recent communication or communication attempt with mobile device 1015 was not successful. The presence component 1030 may be operative to depend on a communication log if the most recent communication or communication attempt is sufficiently recent, such as within a predefined threshold (e.g. thirty minutes). The presence component 1030 may be operative to perform an active determination using delivery channel 1025 if the communication log is insufficiently recent or if no record of a recent communication or communication attempt is logged. The presence component 1030 may use various detectors or sensors to monitor various physical properties of first user 1010 and/or mobile device 1015, such as a proximity detector to detect a distance between first user 1010 and mobile device 1015, an accelerometer to measure movement of mobile device 1015 which implies presence of first user 1010, a thermal sensor to detect heat on a cover of mobile device 1015 which implies first user 1010 is holding mobile device 1015, and so forth.

The display component 1040 may be operative to indicate to a second user 1020 whether the first user 1010 is present to receive SMS messages on the mobile device 1015. The second user 1020 may be using a second device 1025 on which to receive the presence status 1035.

Figure 11:
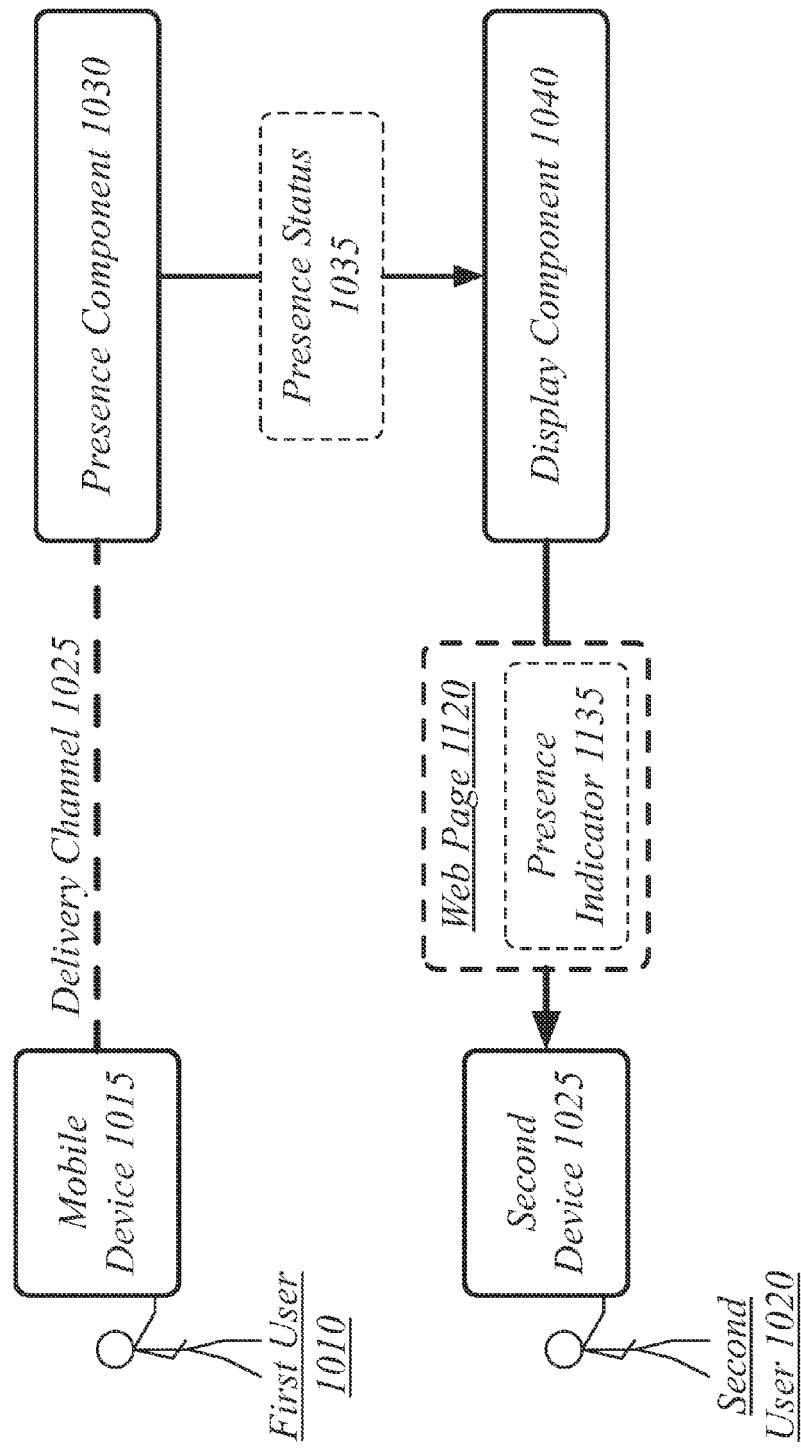
FIG. 11 illustrates a second embodiment of a presence system wherein a web page is used to communicate the presence status.

FIG. 11 illustrates a second embodiment of a presence system 1000 for use with notification system 100 wherein a web page 1120 is used to communicate the presence status 1035 to the second user 1020.

The display component 1040 may be operative to include a SMS presence indicator 1135 for the first user 1010 in a web page 1120 transmitted to the second user 1020, the SMS presence indicator 1135 indicating whether the first user 1010 is present to receive SMS messages on the mobile device 1015. The web page 1120 may be transmitted to second user 1020 on second device 1025. The web page 1120 may be transmitted to second user 1020 in response to second user 1020 requesting the presence of first user 1010, in response to second user 1020 requesting a web page containing information associated with first user 1010, or in response to any web page request by second user 1020.

The presence indicator 1135 may comprise an element of web page 1120 associated with a name, Internet identity, Internet handle, Internet avatar, or other identifier for first user 1010. The presence indicator 1135 may comprise a graphical element, text string, image, or other element capable of indicating whether or not first user 1010 is present. For example, the name of first user 1010 may be displayed on web page 1120 accompanied by a symbol comprising presence indicator 1135 that changes color or shape to communicate presence status 1035. The presence indicator 1135 may be displayed geometrically proximate to the identifier for first user 1010, such as next to, to the side of, above, or beneath the identifier.

In some embodiments, the SMS presence indicator 1135 may indicate an amount of time since the first user 1010 was determined to be present to receive SMS messages on the mobile device 1015. For example the presence indicator 1135 may include a text indicator of the time since the first user 1010 was determined to be present. As the presence indicator 1136 may be one color to indicate presence and another to indicate non-presence, the display component 1040 may be operative to dynamically vary the color of presence indicator 1135 between the former and latter colors to indicate the transition between confirmed presence and uncertainty as to whether the first user 1010 is present. The display component 1040 may be operative to include one of a plurality of presence indicators as the presence indictor 1135 wherein each of the plurality of presence indicators indicates a particular time since first user 1010 was determined to be present on mobile device 1015.

Figure 12:
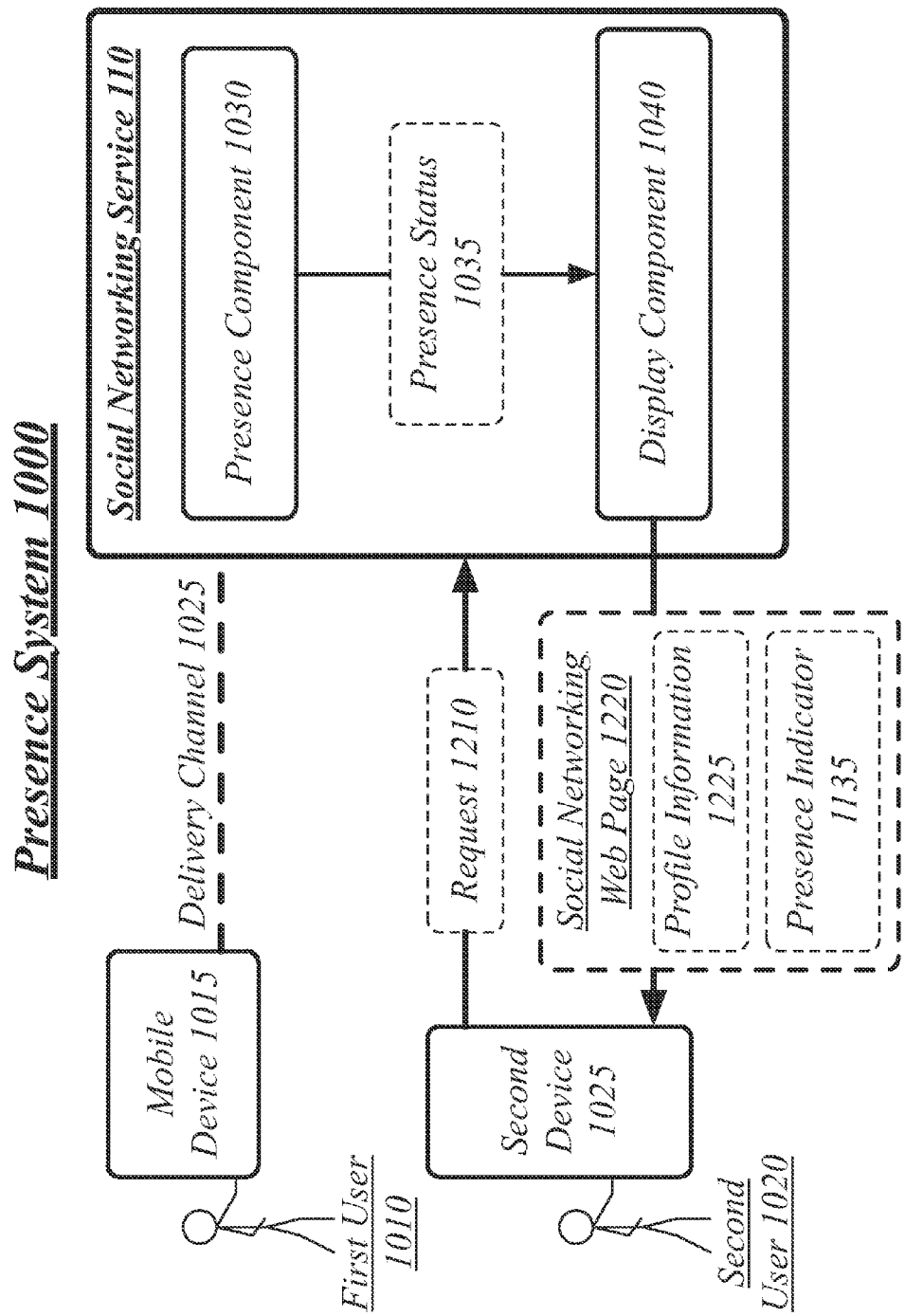
FIG. 12 illustrates a third embodiment of a presence system wherein a social networking web page is used to communicate the presence status.

FIG. 12 illustrates a third embodiment of a presence system 1000 for use with notification system 100 wherein a social networking web page 1220 is used to communicate the presence status 1035 to the second user 1020.

In some embodiments, the web page 1120 may comprise a social networking web page 1220, the first user 1010 and the second user 1020 having a defined relationship in a social networking service 110, the social networking web page 1220 transmitted to the second user 1020 by the social networking service 110. The social networking web page 1220 may be transmitted to the second user 1020 via second device 1025 and display component 1040. As such, the display component 1040 and the presence component 1030 may be components of the social networking service 110, the presence system 1000 performing presence services for the social networking service 110.

The social networking web page 1220 may comprise profile information 1225 for the first user 1010, the presence component 1030 operative to determine whether the first user 1010 is present to receive SMS messages on the mobile device 1015 in response to the second user 1020 requesting the social networking web page 1220 using request 1210. For example, the social networking web page 1220 may comprise a profile of first user 1010 on the social networking service 110. The second user 1020 may use second device 1025 to send a request 1210 to social networking service 110 for the profile of first user 1010 and receive in response social networking web page 1220 include profile information 1225 as part of a web page 1120 containing the profile of first user 1010 presented along with presence indicator 1135.

Figure 13:
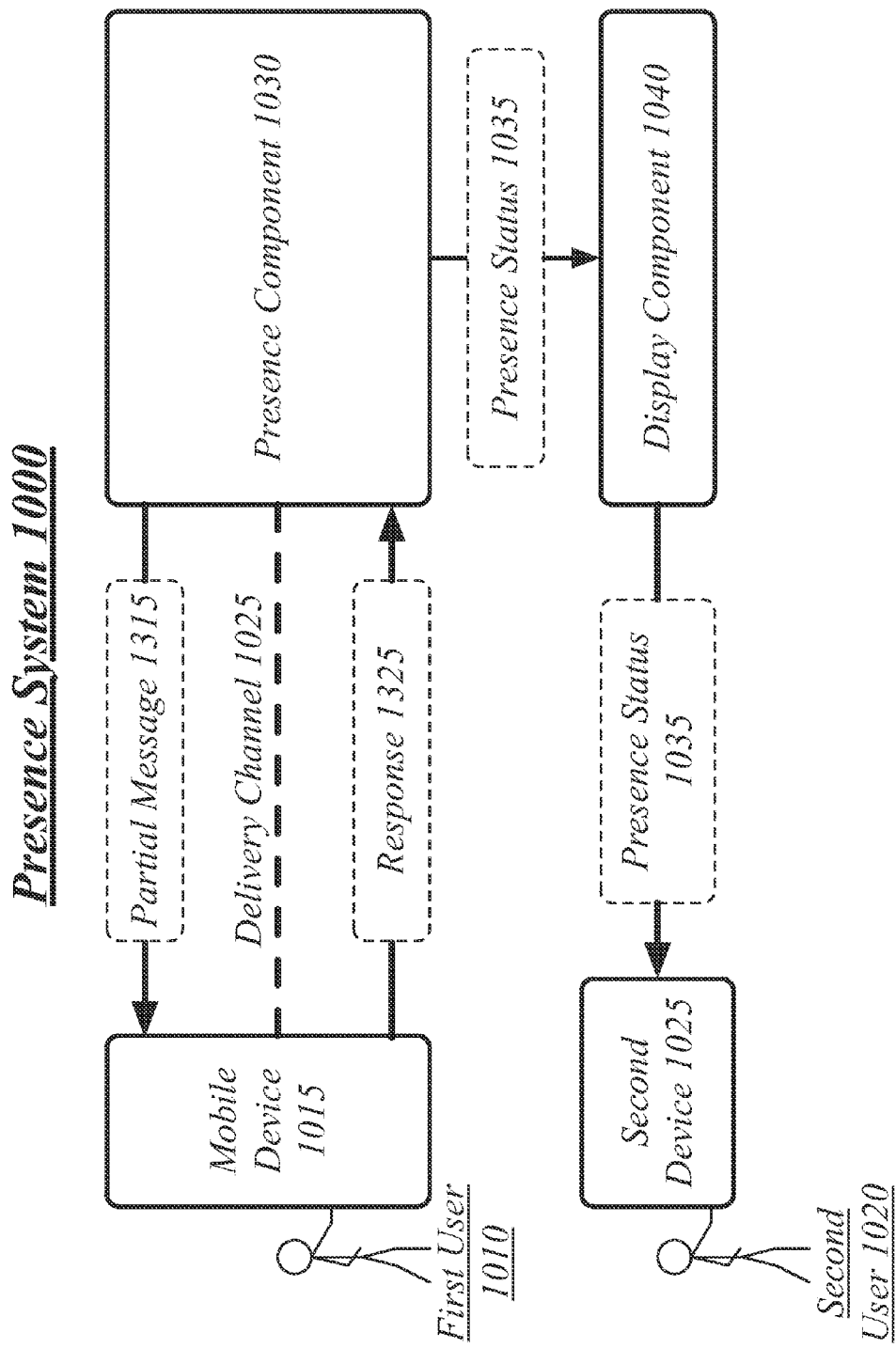
FIG. 13 illustrates a fourth embodiment of a presence system wherein a successful partial message is used to determine that a user is present.

FIG. 13 illustrates a fourth embodiment of a presence system 1000 for use with notification system 100 wherein a successful partial message 1315 is used to determine that a first user 1010 is present on mobile device 1015.

The presence component 1030 may be operative to transmit a partial SMS message 1315 to the mobile device 1015, to receive a response 1325 to the partial SMS message 1315 from the mobile device 1015, and to determine that the first user 1010 is present to receive SMS messages on the mobile device 1015 based on the received response 1325 to the partial SMS message 1315.

A partial message 1315 may comprise a message containing routing information for the mobile device 1015 but without a message body for first user 1010 of mobile device 1015. The partial message 1315 may comprise a metadata command or command in the header of the partial message 1315 to indicate to the mobile device 1015 that a response is requested, such as by sending the "AT" console command in order to request a corresponding "OK" signal from the mobile device 1015.

Figure 14:
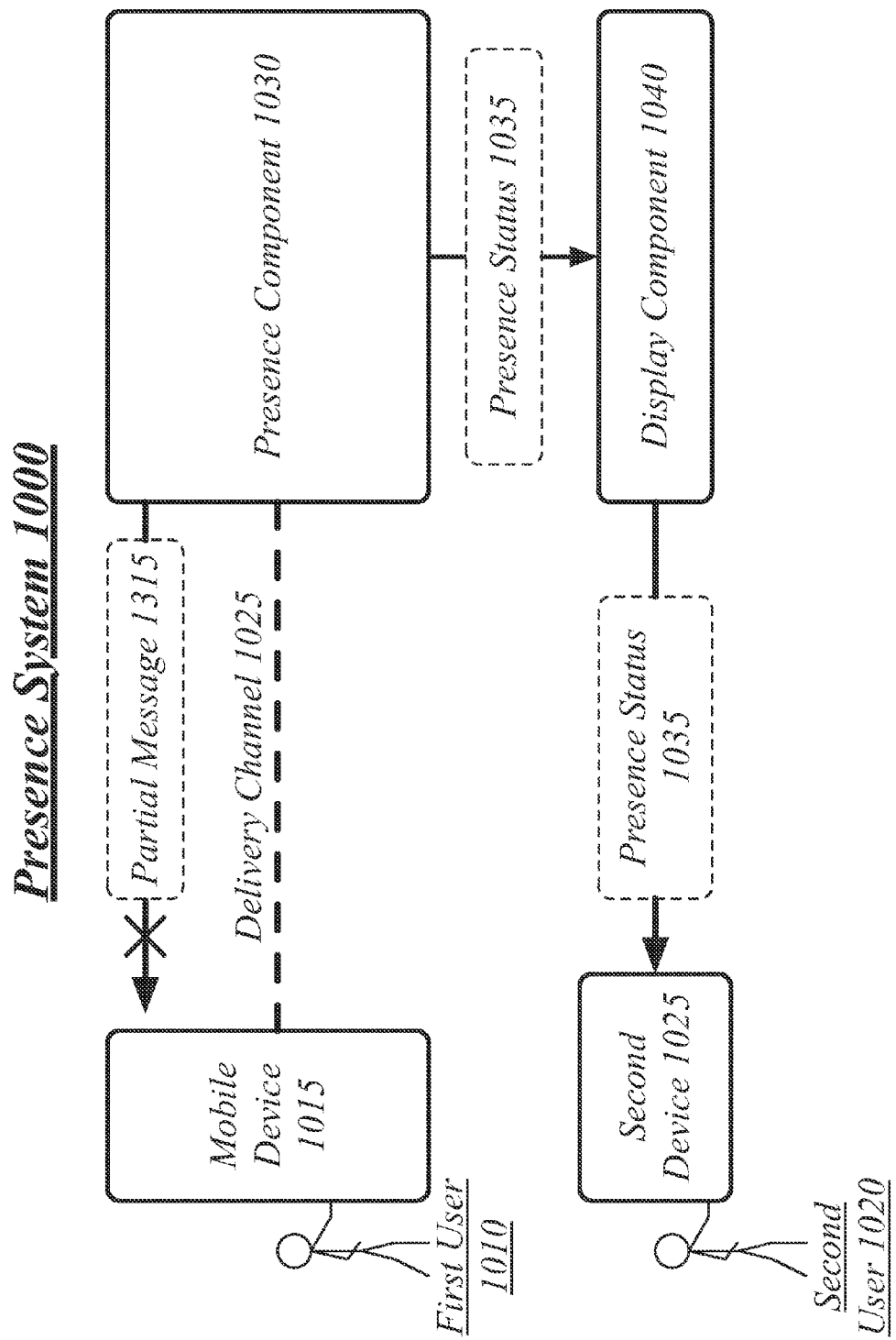
FIG. 14 illustrates a fifth embodiment of a presence system wherein a failed partial message is used to determine that a user is not present.

FIG. 14 illustrates a fifth embodiment of a presence system 1000 for use with notification system 100 wherein a failed partial message 1315 is used to determine that the first user 1010 is not present on mobile device 1015.

The presence component 1030 may be operative to initiate transmission of a partial SMS message 1315 to the mobile device 1015, to determine that the transmission to the mobile device 1015 has failed, and to determine that the first user 1010 is not present to receive SMS messages on the mobile device 1015 based on the failed transmission of partial message 1315 to the mobile device.

Determining that the partial message 1315 was not delivered to the mobile device 1015 may comprise the presence component 1030 calculating that a sufficient period of time has passed since the transmission of the partial message 1315 to the mobile device 1015 without a response 1325 being received to indicate that the mobile device 1015 is available, such as through the expiration of a time-to-live (TTL) timer.

In some embodiments, the presence component 1030 may be operative to perform periodic attempts to transmit partial SMS messages to the mobile device 1015 and to update a presence record for the first user 1010 based on the attempts to transmit, the display component 1040 operative to indicate to the second user 1020 whether the first user 1010 is present to receive SMS messages on the mobile device 1015 based on the presence record. The periodic attempts may be performed on a regular schedule, such as once every hour, half-hour, or day.

In some embodiments, the presence component 1030 may be operative to delay the periodic attempts to transmit partial SMS messages when the presence component 1030 determines that the first user 1010 has successful transmitted or received an SMS message using the mobile device 1015. For example, if the presence system 1000 is being used as part of a social networking service 110, the social networking service 110 may sometimes exchange SMS messages with the first user 1010 using mobile 1015 such as the transmission of notifications. The presence component 1030 may be operative to record the successful transmission of a notification 155 to the mobile device 1015 in the same manner as a successful check using a partial message 1315. As such, this may delay the next iteration of periodic attempts to update the presence record for a first user 1010.

In some embodiments, the presence component 1030 may be operative to determine whether the first user 1010 is present to receive SMS messages on the mobile device 1015 in response to the second user 1020 initiating the composition of a message to the first user 1010. For example, if the presence system 1000 is being used as part of a social networking service 110, the second user 1020 may be compose a message on the social networking service 110— such as by using a web page or standalone application for the social networking service 110—for sending to the first user 1010 over the social networking service 110. In response to the second user 1020 initiating composition of the message, the social networking service 110 may be operative to request that the presence component 1030 determine presence status 1035. Upon the determination of presence status 1035, the social networking service 110 may communicate that presence status 1035 to the second user 1020 on the social networking web page 1220 being used to compose the message via the presence indicator 1135. As such, the second user 1020 composing the message may be informed of the possibility that first user 1010 is available to receive the message via an SMS message.

Figure 15:
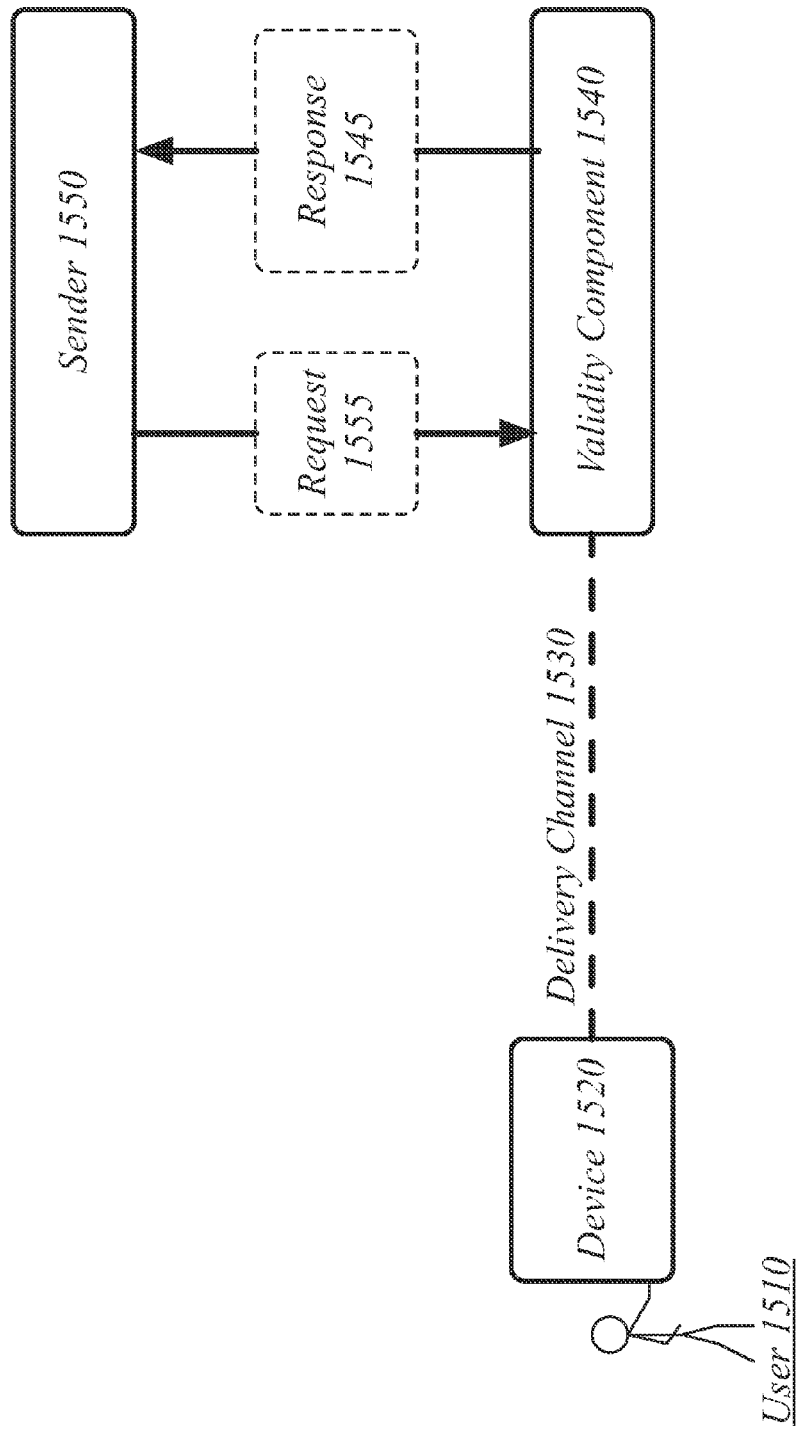
FIG. 15 illustrates an embodiment of a validity system.

FIG. 15 illustrates an embodiment of a validity system 1500 for use with notification system 100. The validity system 1500 may comprise a validity component 1540. The validity system 1500 may comprise a sub-component of channel component 140 of notification engine 130.

The validity component 1540 may be operative to determine whether a delivery channel 1530 associated with a user 1510 is valid for communication with the user 1510. In some embodiments, the delivery channel 1530 may comprise one of a plurality of delivery channels 170-a used by a notification engine 130. A delivery channel 1530 may be considered valid if the information available to validity component 1540 indicates that the user 1510 actually available through device 1520 is the user desired for communication, such as a subscriber 120 to a notification engine 130.

The validity component 1540 may be operative to receive a request 1555 from a sender 1550 to determine whether the delivery channel 1530 is valid, to determine whether the delivery channel 1530 is valid in response to the request 1555, and to transmit a response 1545 to the request 1555 to the sender 1550 based on the determination of whether the delivery channel 1530 is valid. In some embodiments, the sender 1550 may comprise the channel component 140 of a notification engine 130 serving as part of a social networking service 110. As discussed, the channel component 140 may be operative to check the validity of a delivery channel 1530 in response to the need to determine what channels 145 of a plurality of delivery channels 170-a to use in sending a notification 155.

Figure 16:
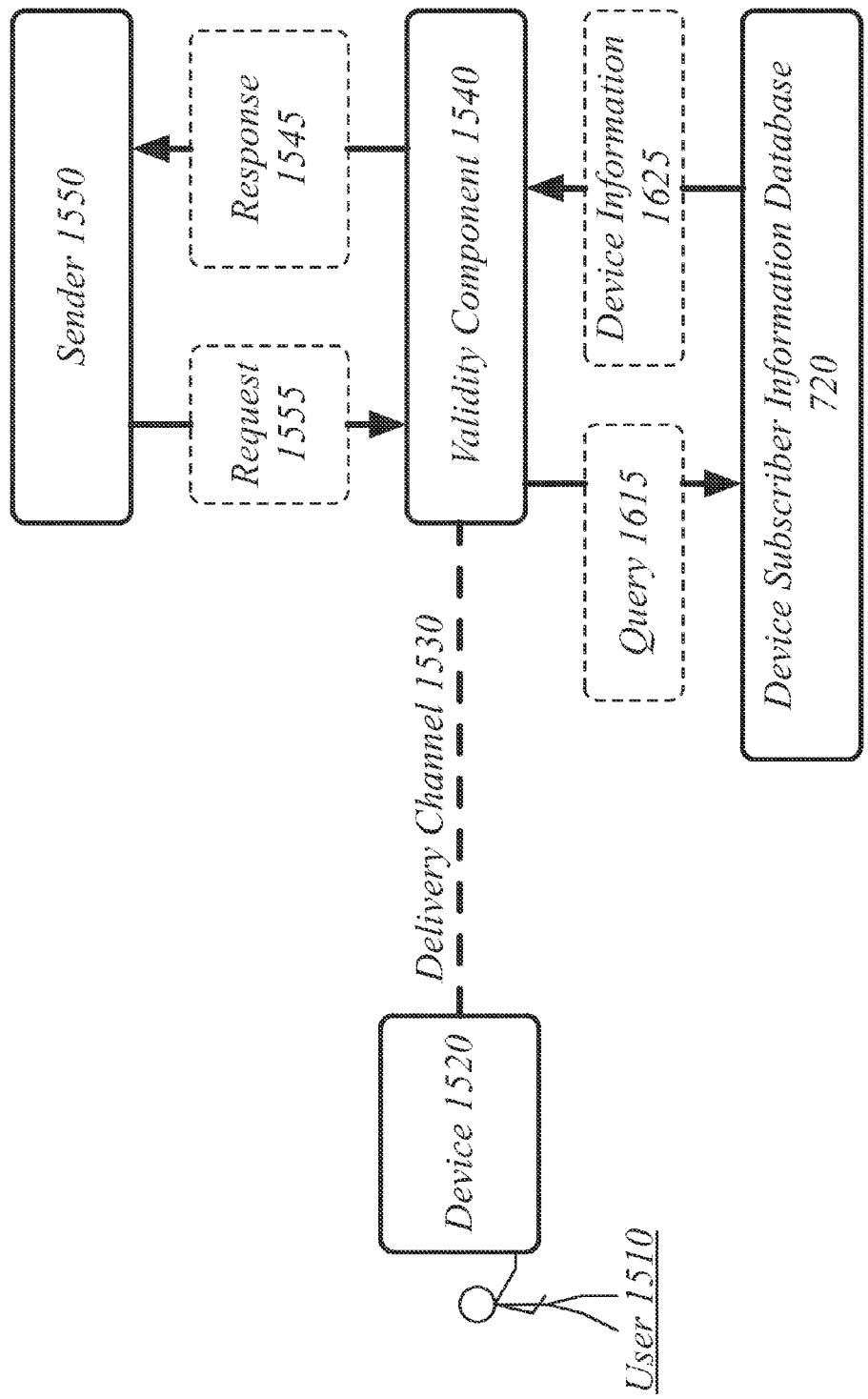
FIG. 16 illustrates a second embodiment of a validity system wherein a device subscriber information database is used to determine the validity of delivery channel.

FIG. 16 illustrates a second embodiment of a validity system 1500 for use with notification system 100 wherein a device subscriber information database 720 is used to determine the validity of delivery channel 1530.

In some embodiments, the validity component 1540 may be operative to query a database of device subscriber information for device information 1625 of a device 1520 associated with the delivery channel 1530, to analyze the device information 1625 to determine whether the device 1520 is associated with the user 1510, and to determine whether the delivery channel 1530 is valid based on whether the device 1520 is associated with the user. The query 1615 may be sent to the device subscriber information database 720 specifying an identifier for the device 1520, the device information 1625 received in response including information relevant to the determination of whether delivery channel 1530 is valid.

For example, the device 1520 may comprise a mobile phone with an associated phone number, the database comprising a Subscriber Presence and Profile Database (SSPD) such as a Home Location Register (HLR), Home Subscriber Server (HSS), or User Profile Server Function (UPSF) maintained by a cellular provider. The validity component 1540 may be operative to determine that the delivery channel 1530 is valid based on the phone number being associated with a subscriber identity module (SIM) card in the SSPD, wherein the SIM card matches a previous SIM card that the validity component 1540 determined was associated with the phone number. Similarly, the validity component 1540 may be operative to determine that the delivery channel 1530 is not valid based on the phone number being associated with a subscriber identity module (SIM) card in the SSPD, wherein the SIM card does not match a previous SIM card that the validity component 1540 determined was associated with the phone number.

In some embodiments, the validity component 1540 may be operative to determine that the delivery channel is not valid based on a validity period expiring. The validity component 1540 may be operative to set the start of a validity period when the user 1510 confirms that device 1520 actually belongs to user 1510, such as by entering an identifier (e.g. a phone number) for device 1520 with validity component 1540 or by explicitly confirming the validity with validity component 1540. For example, if validity component 1540 is a component of a notification engine 130 as part of social networking service 110, the validity component 1540 may be notified by the social networking service 110 to start the validity period based on the user 1510 registering device 1520 with the social networking service 110.

The validity period may comprise a period of time determined to be less than the recycle time of an identifier for device 1520, such as a phone number. After a user 1510 relinquishes a phone number the phone number may eventually be recycled by a telephone or cellular telephone provider. Typically the provider will have a delay period they will wait before recycling the number and assigning it to a new user. The validity period may be set to expire the delivery channel 1530—set the delivery channel 1530 as being not valid—after the expiration of the validity period to indicate the possibility that the identifier for device 1520 is associated with a new user.

In some embodiments, the validity component 1540 may be operative to extend the validity period based on the validity component 1540 determining that the user 1510 has successfully transmitted or received using the delivery channel 1530. For example, if validity component 1540 is a component of a notification engine 130 as part of social networking service 110, the validity component 1540 may notified if the notification engine 130 or social networking service 110 has successful contact with the user 1510 over the delivery channel 1530.

In some embodiments, determining that a delivery channel 1530 is not valid may comprise flagging, noting, registering, or otherwise indicating in association with the store of information for delivery channel 1530 that the delivery channel 1530 is not valid and should not be used for communication. In some cases, a notification engine 130 or a social networking service 110 may have one or more delivery channels assigned to a subscriber 120. As such, in some embodiments if a delivery channel 1530 assigned to the subscriber 120 is determined to not be valid, the assignment of the delivery channel 1530 to the subscriber 120 may be flagged, noted, registered, or otherwise indicate that the delivery channel 1530 should not be used, or is not currently trusted, as a delivery channel for the subscriber 120. In some cases, the social networking service 110 may be operative to contact the subscriber 120 when a delivery channel 1530 is indicated as not being valid in order to determine whether the delivery channel 1530 may still be used to communicate with the subscriber 120. Alternatively, if a delivery channel 1530 assigned to the subscriber 120 is determined to not be valid, the assignment between the delivery channel 1530 and the subscriber 120 may be revoked or removed such that the delivery channel 1530 is no longer assigned to the subscriber 120.

Figure 17:
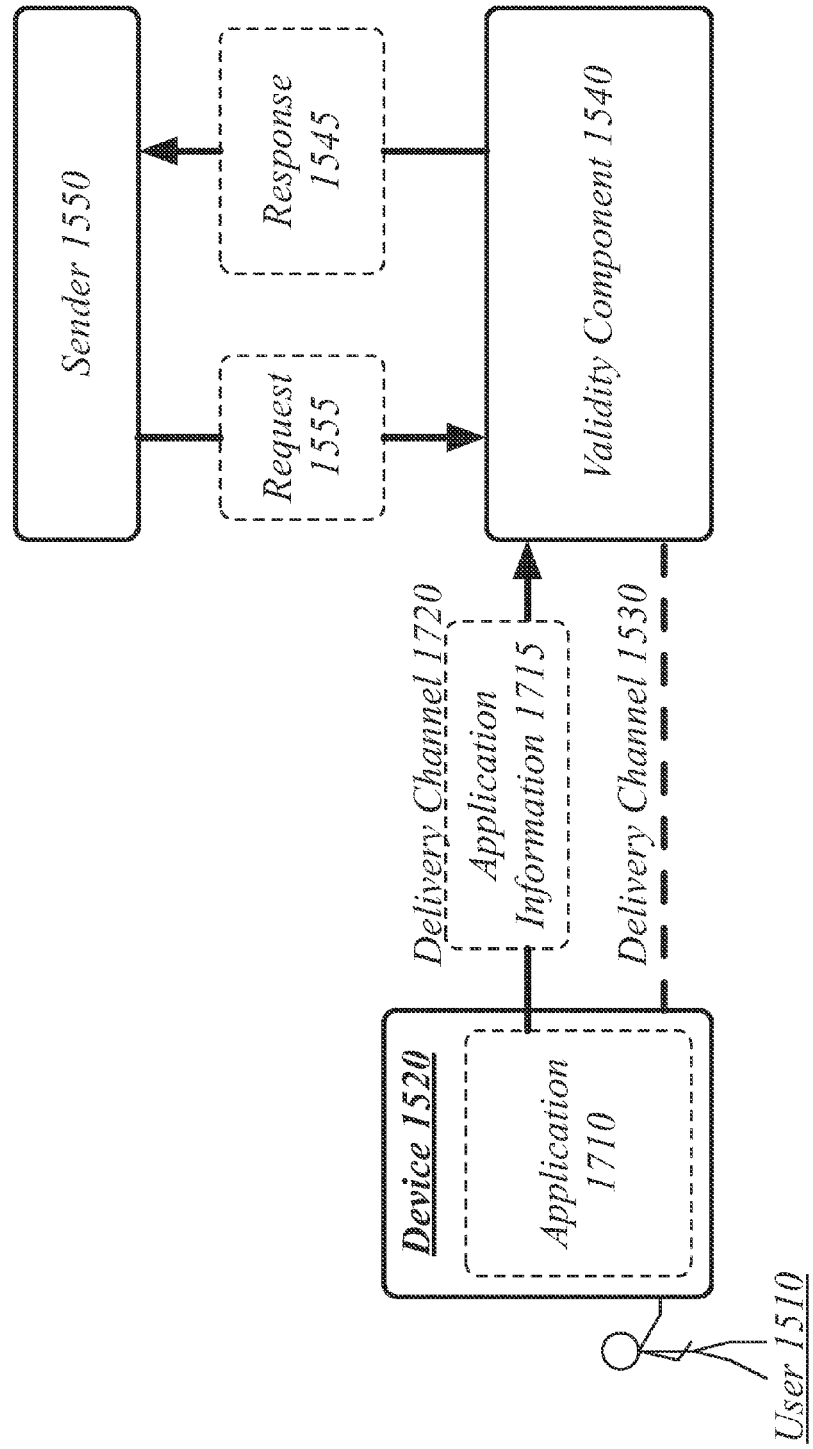
FIG. 17 illustrates a third embodiment of a validity system wherein an application on a device is used to check the validity of a delivery channel.

FIG. 17 illustrates a third embodiment of a validity system 1500 for use with notification system 100 wherein an application 1710 on the device 1520 is used to check the validity of delivery channel 1720.

In some embodiments, the delivery channel 1530 may be associated with a device 1520, the validity component 1540 operative to determine whether the delivery channel 1530 is valid based on application information 1715 received from an application 1710 installed on the device 1520, the application 1710 distinct from the delivery channel 1530. A delivery channel 1530 may be associated with a device 1520 in the sense that the delivery channel 1530 is associated with an identifier bound to the device 1520 instead of the user 1510, such as a phone number for the device 1520.

If the device 1520 comprises a mobile computer such a smartphone, application 1710 may be a first-party, second-party, or third-party application installed on the device 1520. If the validity component 1540 is a component of a social networking service 110, the application 1710 may comprise an application 1710 provided by social networking service 110 for use with social networking service 110. For example, application 1710 may be a push-enabled application 1710 capable of receiving push notifications over a delivery channel 1720 such as the Internet. The application 1710 may contain registration information for the user 1510 in the social networking service 110, the registrations information confirming that application 1710 installed on device 1520 is associated with user 1510 and that therefore alternate delivery channel 1530 to device 1520 is valid.

Application information 1715 sent from application 1710 to validity component 1540 over delivery channel 1720 may be sent in response to a query by validity component 1540 to application 1710 to confirm the identity of user 1510 associated with the application 1710. The validity component 1540 may be operative to send this query to the application 1710 in response to the request 1555 from sender 1550 to determine whether delivery channel 1530 is valid. The application information 1715 may comprise identity information of user 1510 or may comprise a confirmation of an identity sent by the validity component 1540 to the application 1710.

Figure 18:
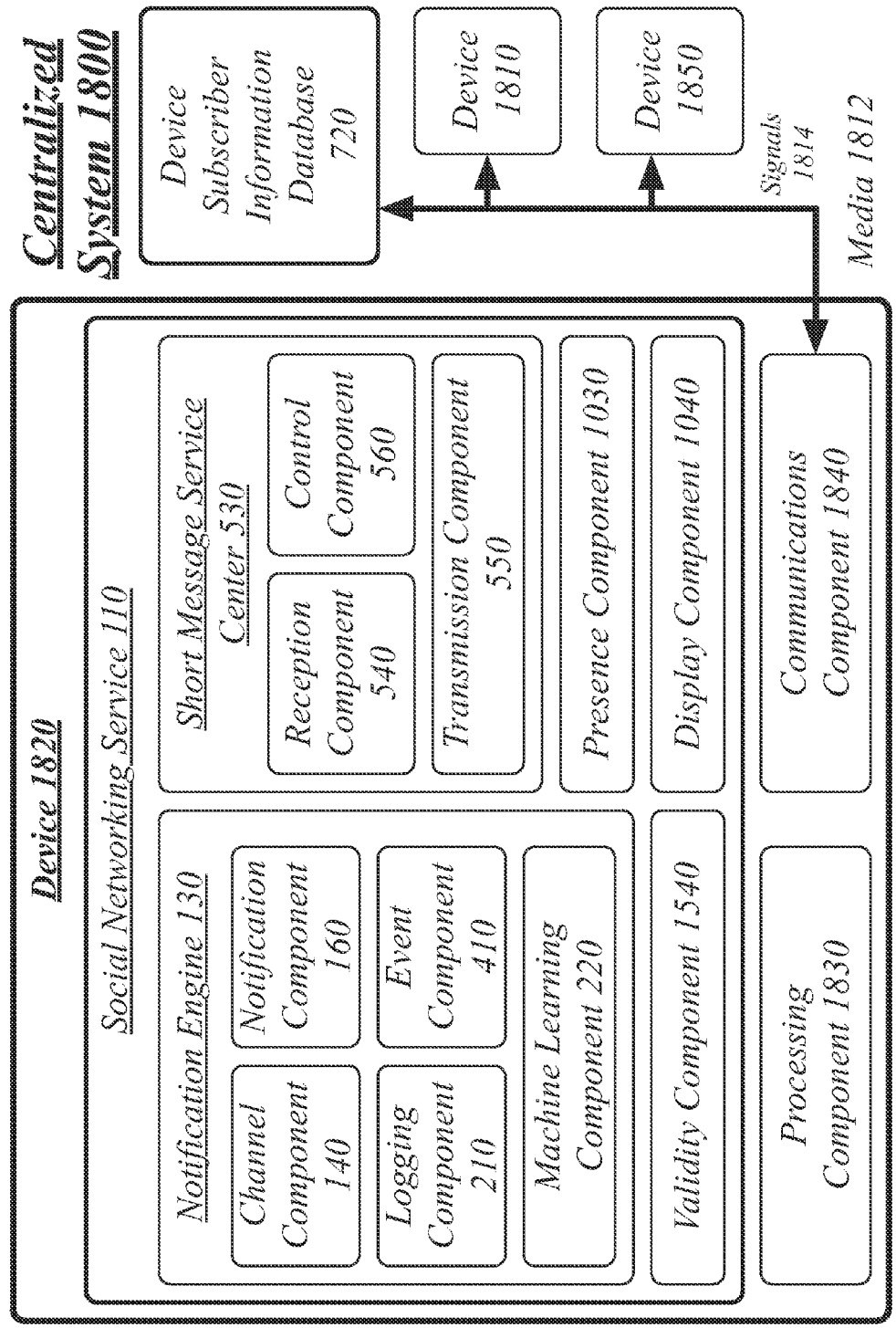
FIG. 18 illustrates an embodiment of a centralized system for the system of FIG. 1.

FIG. 18 illustrates a block diagram of a centralized system 1800. The centralized system 1800 may implement some or all of the structure and/or operations for the social networking service 110 in a single computing entity, such as entirely within a single device 1820.

The device 1820 may comprise any electronic device capable of receiving, processing, and sending information for the social networking service 110. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1820 may execute processing operations or logic for the social networking service 110 using a processing component 1830. The processing component 1830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1820 may execute communications operations or logic for the social networking service 110 using communications component 1840. The communications component 1840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1820 may communicate with other devices 1810, 1850 over a communications media 1812 using communications signals 1814 via the communications component 1840. The devices 1810, 1850 may be internal or external to the device 1820 as desired for a given implementation.

Social networking service 110 may include within it notification engine 100, SMSC 530, validity component 1540, presence component 1030, and display component 1040. Device 1820 may be operative to carry out the tasks of these elements using processing component 1830 and communications component 1840. Devices 1810 and 1850 may comprise any of device 520, mobile device 1015, second device 1025, or device 1520, the signals 1814 over media 1812 comprising the interactions between the social networking service 110 and its elements and these respective devices.

FIG. 19 illustrates a block diagram of a distributed system 1900. The distributed system 1900 may distribute portions of the structure and/or operations for the social networking service 110 across multiple computing entities. Examples of distributed system 1900 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1900 may comprise server devices 1915, 1925, 1935, 1945, and 1955. In general, the server devices 1915, 1925, 1935, 1945, and 1955 may be the same or similar to the client device 1820 as described with reference to FIG. 18. For instance, the server systems 1915, 1925, 1935, 1945, and 1955 may each comprise a processing component 1930 and a communications component 1940 which are the same or similar to the processing component 1830 and the communications component 1840, respectively, as described with reference to FIG. 18. In another example, the server devices 1915, 1925, 1935, 1945, and 1955 may communicate over a communications media 1912 using communications signals 1914 via the communications components 1940.

The server devices 1915, 1925, 1935, 1945, and 1955 may comprise or employ one or more client programs that operate to perform various methodologies in accordance with the described embodiments. Similarly, the server devices 1915, 1925, 1935, 1945, and 1955 may comprise or employ one or more server programs that operate to perform various methodologies in accordance with the described embodiments. For example, server device 1915 may implement social networking service 110 or, similarly, the portions of social networking service 110 other than those hosted on other server devices. It will be appreciated the server device 1915—or any of the server devices—may itself comprise multiple servers. Server device 1925 may implement notification engine 130 which may perform notification functions on behalf of social networking service 110. Server device 1935 may implement SMSC 530, which may perform SMS messaging and SMS message management on behalf of notification engine 130 and social networking service 110. Server device 1945 may implement presence system 1000, which may perform presence functions on behalf of social networking service 110, notification engine 130, and SMSC 530. It will be appreciated that some of the functions of presence system 1000 may use SMSC 530, such as for the determination of SMS presence. Server device 1955 may implement validity system 1000, which may perform validity functions on behalf of social networking service 110, notification engine 130, and SMSC 530. It will be appreciated that some of the functions of the validity system 1500 may use SMSC 530, such as for checking the validity of an SMS delivery channel.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 20 illustrates one embodiment of a logic flow 2000. The logic flow 2000 may be representative of some or all of the operations executed by one or more embodiments described herein.

In the illustrated embodiment shown in FIG. 20, the logic flow 2000 may be operative at block 2002 to receive from a social networking service 110 an event 115 associated with a subscriber 120 of the social networking service 110. It will be appreciated that the logic flow 2000 may be implemented by the social networking service 110 and that as such the reception of the event 115 may comprise one component of the social networking service 110 transmitting the event 115 to a component of the social networking service responsible for performing logic flow 2000, such as notification engine 130.

The logic flow 2000 may be operative at block 2004 to determine to communicate the event 115 to the subscriber 120. The determination to communicate the event 115 to the subscriber 120 may comprise a determination to attempt to communicate the event 115, wherein that determination may be adjusted or changed over time as the context develops. For example, if the event 115 were to cease being relevant to subscriber 120 prior to the event 115 being communicated, the communication may be cancelled.

The logic flow 2000 may be operative at block 2006 to determine one or more channels 145 of a plurality of channels 170-a to use to communicate the event 115 to the subscriber 120 according to rankings 150 associated with each channel 170-a, the rankings 150 specific to the subscriber 120 and determined according to subscriber information. For example, subscriber responses 265-c to prior notifications 255-b may be recorded, the recorded responses 265-c comprising the subscriber history. Rankings may be determined for each of the plurality of channels 170-a according to the recorded responses. The determining of the one or more channels 145 may therefore be based on the associated rankings 150 and one or more of preferences set by the subscriber 120, information about subscriber devices, subscriber presence on one or more devices, a current location, or a current date and time.

The logic flow 2000 may be operative at block 2008 to construct a notification 155 based on the event 115. Constructing the notification 155 may comprise converting the event 115 from a machine-readable form appropriate for processing by notification engine 130 to a human-readable form appropriate for reading by the subscriber 120. This conversion may be dependent on the capabilities of the determined delivery channels 145 and may include multiple human-readable forms each one specific to one or more of the determined delivery channels 145.

The logic flow 2000 may be operative at block 2010 to transmit the notification 155 to the subscriber 120 using the determined one or more channels 145. This transmission may comprise the substantially-parallel transmission of the notification 155 across each of the determined delivery channels 145. If one of the determined delivery channels 145 is SMS the transmission of notification 155 may include sending the notification 155 to the SMSC 530 for transmission using the SMSC 530 transmission component 550.

In some embodiments, the logic flow 2000 may be further operative to determine two or more channels 145 of the plurality of channels 170-a to use to communicate the event 115 to the subscriber 120, to determine that one of the two or more determined channels 145 has successfully transmitted the event 115 to the subscriber 120, and cancel transmission of the event 115 to the subscriber 120 on channels other than the one that successfully transmitted the event 115 to the subscriber 120. This may be prevent the subscriber 120 from being harassed by notification of an event 115 of which they were already notified.

In some embodiments, the logic flow 2000 may be further operator to receive a second event 315 associated with the subscriber 120, determine to communicate the second event 315 to the subscriber 120, combine the event 115 and the second event 315 into a second notification 355, and replace the notification 155 for transmission to the subscriber 120 with the second notification 355. This may serve to reduce the number of notifications sent to a subscriber 120 and therefore reduce any distraction of the subscriber 120 at receiving a notification 155 or 355 while still communicating both events 115 and 315.

In some embodiments, logic flow 2000 may be further operative to determine that one of the determined channels 145 has had a failed delivery attempt, to determine an additional channel of the plurality of channels 170-a to use to communicate the event 115 to the subscriber 120 in response to the failed delivery attempt according to the rankings 150 associated with each channel 170-a, and transmit the notification 155 to the subscriber using the determined additional channel. If SMSC 530 is being used in the transmission of notification 155 the determination that one of the determined channels 145 has had a failed delivery attempt may comprise the transmission component failing to receive a response to a partial message 615, notifying the control component 560 via monitoring information 555, and the control component 560 sending a notification 665 of the failed delivery attempt to the notification engine 130.

In some embodiments, logic flow 2000 may be further operative to check the validity of one or more of the plurality of channels 170-a in response to the received event 115 and determine the one or more channels 145 to use to communicate the event 115 to the subscriber 120 according to the validity check. For example, the notification engine 130 may use validity component 1540 as part of validity system 1500 to determine whether a delivery channel is valid. If the delivery channel being check is an SMS channel, SMSC 1530 may be used, such as with validity component 1540, to determine whether the SMS channel is valid, such as by performing a check with device subscriber information database 720.

Figure 21:
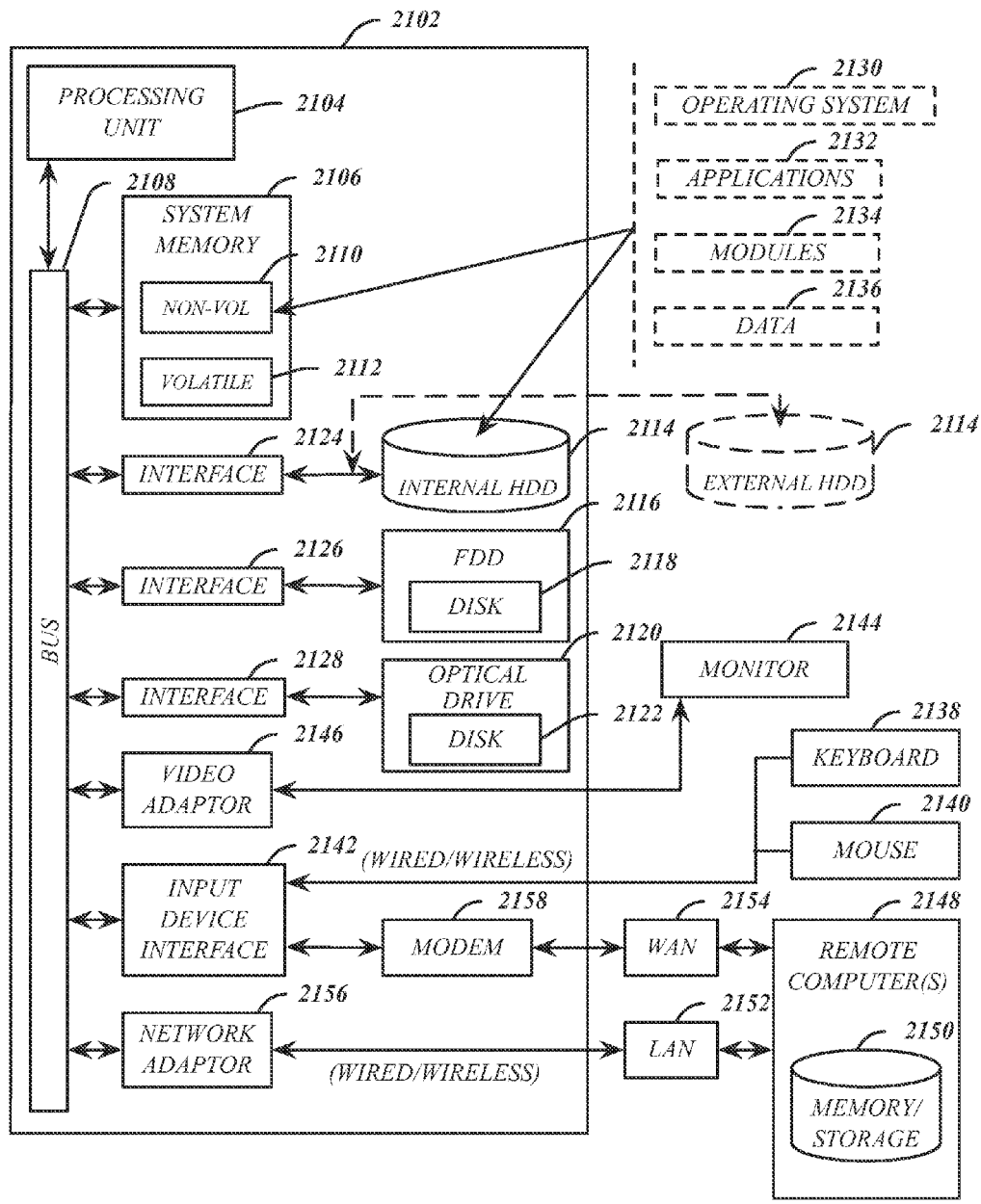
FIG. 21 illustrates an embodiment of a computing architecture.

FIG. 21 illustrates an embodiment of an exemplary computing architecture 2100 suitable for implementing various embodiments as previously described. In one embodiment, the computing architecture 2100 may comprise or be implemented as part of an electronic device. Examples of an electronic device may include those described with reference to FIG. 18, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2100.

As shown in FIG. 21, the computing architecture 2100 comprises a processing unit 2104, a system memory 2106 and a system bus 2108. The processing unit 2104 can be any of various commercially available processors, including without limitation an AMD®, Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2104.

The system bus 2108 provides an interface for system components including, but not limited to, the system memory 2106 to the processing unit 2104. The system bus 2108 can be any of several types of bus structure that may further interconnect to a memory bus (with or without a memory controller), a peripheral bus, and a local bus using any of a variety of commercially available bus architectures. Interface adapters may connect to the system bus 2108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 21, the system memory 2106 can include non-volatile memory 2110 and/or volatile memory 2112. A basic input/output system (BIOS) can be stored in the non-volatile memory 2110.

The computer 2102 may include various types of computer-readable storage media in the form of one or more lower speed memory units, including an internal (or external) hard disk drive (HDD) 2114, a magnetic floppy disk drive (FDD) 2116 to read from or write to a removable magnetic disk 2118, and an optical disk drive 2120 to read from or write to a removable optical disk 2122 (e.g., a CD-ROM or DVD). The HDD 2114, FDD 2116 and optical disk drive 2120 can be connected to the system bus 2108 by a HDD interface 2124, an FDD interface 2126 and an optical drive interface 2128, respectively. The HDD interface 2124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2110, 2112, including an operating system 2130, one or more application programs 2132, other program modules 2134, and program data 2136. In one embodiment, the one or more application programs 2132, other program modules 2134, and program data 2136 can include, for example, the various applications and/or components of the social networking service 110.

A user can enter commands and information into the computer 2102 through one or more wire/wireless input devices, for example, a keyboard 2138 and a pointing device, such as a mouse 2140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2104 through an input device interface 2142 that is coupled to the system bus 2108, but can be connected by other interfaces such as a parallel port, IEEE 1394 serial port, a game port, a USB port, an IR interface, and so forth.

A monitor 2144 or other type of display device is also connected to the system bus 2108 via an interface, such as a video adaptor 2146. The monitor 2144 may be internal or external to the computer 2102. In addition to the monitor 2144, a computer typically includes other peripheral output devices, such as speakers, printers, and so forth.

The computer 2102 may operate in a networked environment using logical connections via wire and/or wireless communications to one or more remote computers, such as a remote computer 2148. The remote computer 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wire/wireless connectivity to a local area network (LAN) 2152 and/or larger networks, for example, a wide area network (WAN) 2154. Such LAN and WAN networking environments are commonplace in offices and companies, and facilitate enterprise-wide computer networks, such as intranets, all of which may connect to a global communications network, for example, the Internet.

When used in a LAN networking environment, the computer 2102 is connected to the LAN 2152 through a wire and/or wireless communication network interface or adaptor 2156. The adaptor 2156 can facilitate wire and/or wireless communications to the LAN 2152, which may also include a wireless access point disposed thereon for communicating with the wireless functionality of the adaptor 2156.

When used in a WAN networking environment, the computer 2102 can include a modem 2158, or is connected to a communications server on the WAN 2154, or has other means for establishing communications over the WAN 2154, such as by way of the Internet. The modem 2158, which can be internal or external and a wire and/or wireless device, connects to the system bus 2108 via the input device interface 2142. In a networked environment, program modules depicted relative to the computer 2102, or portions thereof, can be stored in the remote memory/storage device 2150. It will be appreciated that the network connections shown are exemplary and other means of establishing a communications link between the computers can be used.

The computer 2102 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 22:
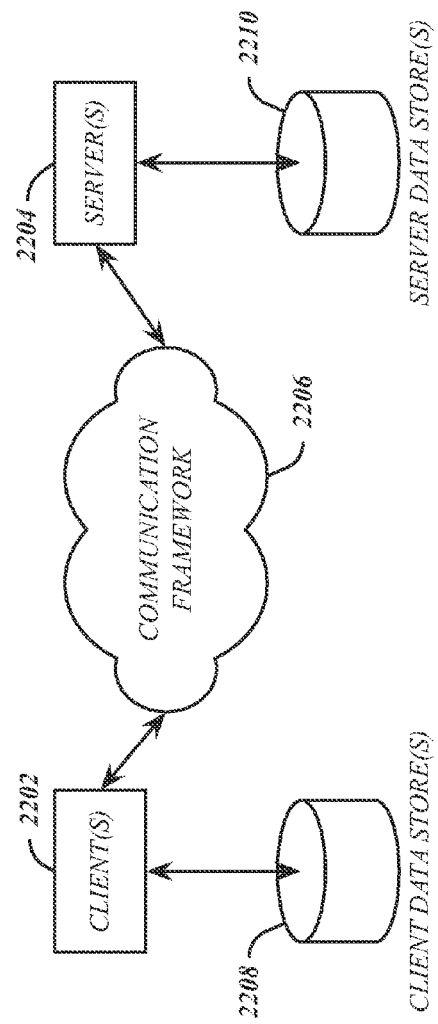
FIG. 22 illustrates an embodiment of a communications architecture.

FIG. 22 illustrates a block diagram of an exemplary communications architecture 2200 suitable for implementing various embodiments as previously described. The communications architecture 2200 includes various common communications elements, such as a transmitter, receiver, transceiver, radio, network interface, baseband processor, antenna, amplifiers, filters, power supplies, and so forth. The embodiments, however, are not limited to implementation by the communications architecture 2200.

As shown in FIG. 22, the communications architecture 2200 comprises includes one or more clients 2202 and servers 2204. The clients 2202 may implement the devices 1810 or 1850. The servers 2204 may implement the server devices 1820, 1915, 1925, 1935, 1945, or 1955. The clients 2202 and the servers 2204 are operatively connected to one or more respective client data stores 2208 and server data stores 2210 that can be employed to store information local to the respective clients 2202 and servers 2204, such as cookies and/or associated contextual information.

The clients 2202 and the servers 2204 may communicate information between each other using a communication framework 2206. The communications framework 2206 may implement any well-known communications techniques and protocols. The communications framework 2206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2202 and the servers 2204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processor circuit;
   a hardware communications component; and
   a presence component operative on the processor circuit to determine whether a first user is present to receive a first short message service (SMS) message on a mobile device in response to a second user requesting a social networking web page containing profile information for the first user, wherein the first user and the second user have a defined relationship in a social networking service, and to perform periodic attempts to transmit partial SMS messages to the mobile device via the hardware communications component and to update a presence record for the first user based on the attempts to transmit, wherein the partial SMS messages are separate from the first SMS message and comprise a header comprising a command to request a response, and to delay the periodic attempts to transmit the partial SMS messages when the presence component determines that the first user has successfully transmitted or received a second SMS message using the mobile device; and
   a display component operative on the processor circuit to indicate to the second user whether the first user is present to receive the first SMS message on the mobile device.

2. The apparatus of claim 1, the display component operative to include a SMS presence indicator for the first user in the social networking web page transmitted to the second user, the SMS presence indicator indicating whether the first user is present to receive the first SMS message on the mobile device.

3. The apparatus of claim 2, the SMS presence indicator indicating an amount of time since the first user was determined to be present to receive the first SMS message on the mobile device.

4. The apparatus of claim 1, the presence component operative to transmit a partial SMS message to the mobile device, to receive a response to the partial SMS message from the mobile device, and to determine that the first user is present to receive the first SMS message on the mobile device based on the received response to the partial SMS message.

5. The apparatus of claim 1, the presence component operative to initiate transmission of a partial SMS message to the mobile device, to determine that the transmission to the mobile device has failed, and to determine that the first user is not present to receive the first SMS message on the mobile device based on the failed transmission to the mobile device.

6. The apparatus of claim 1, the display component operative to indicate to the second user whether the first user is present to receive the first SMS message on the mobile device based on the presence record.

7. The apparatus of claim 1, the presence component operative to determine whether the first user is present to receive the first SMS message on the mobile device in response to the second user initiating composition of a message to the first user.

8. A computer-implemented method, comprising:
   transmitting, periodically, a partial short message service (SMS) message to a mobile device of a first user in response to a second user requesting a social networking web page containing profile information for the first user, wherein the first user and the second user have a defined relationship in a social networking service, wherein the partial SMS message comprises a header comprising a command to request a response;
   receiving a response to the partial SMS message from the mobile device;
   updating a presence record for the first user based on the transmitting;
   determining whether the first user is present to receive a first SMS message on the mobile device based on the received response to the partial SMS message;
   delaying the periodic transmittals of the partial SMS messages when the first user has successfully transmitted or received a second SMS message using the mobile device; and
   indicating to the second user whether the first user is present to receive the first SMS message on the mobile device.

9. The method of claim 8, comprising:
   including a SMS presence indicator for the first user in the social networking web page transmitted to the second user, the SMS presence indicator indicating whether the first user is present to receive the first SMS message on the mobile device and an amount of time since the first user was determined to be present to receive the first SMS message on the mobile device.

10. The method of claim 8, comprising:
initiating transmission of the partial SMS message to the mobile device;
determining that the transmission to the mobile device has failed; and
determining that the first user is not present to receive the first SMS message on the mobile device based on the failed transmission to the mobile device.

11. The method of claim 8, comprising:
determining whether the first user is present to receive the first SMS message on the mobile device in response to the second user initiating composition of a message to the first user.

12. At least one non-transitory computer-readable storage medium comprising instructions that, when executed, cause a system to:
transmit, periodically, a partial short message service (SMS) message to a mobile device of a first user in response to a second user requesting a social networking web page containing profile information for the first user, wherein the first user and the second user have a defined relationship in a social networking service, wherein the partial SMS message comprises a header comprising a command to request a response;
receive a response to the partial SMS message from the mobile device;
determine whether the first user is present to receive a first short message service (SMS) message on the mobile device based on received response to the partial SMS message;
update a presence record for the first user based on the transmitting;
delay the periodic transmittals of the partial SMS message when the first user has successfully transmitted or received a second SMS message using the mobile device; and
indicate to the second user whether the first user is present to receive the first SMS message on the mobile device.

13. The non-transitory computer-readable storage medium of claim 12, comprising instructions that when executed cause the system to:
determine that the transmission of the partial SMS message to the mobile device has failed; and
determine that the first user is not present to receive the first SMS message on the mobile device based on the failed transmission to the mobile device.

14. The non-transitory computer-readable storage medium of claim 12, comprising instructions that when executed cause the system to:
determine whether the first user is present to receive the first SMS message on the mobile device in response to the second user initiating composition of a message to the first user.

* * * * *